(12) United States Patent
Horie et al.

(10) Patent No.: US 7,645,823 B2
(45) Date of Patent: Jan. 12, 2010

(54) RESIN COMPOSITION, MOLDED PRODUCT FROM RESIN COMPOSITION AND METHOD FOR PREPARING RESIN COMPOSITION

(75) Inventors: Takeshi Horie, Kanagawa (JP); Shinichiro Yamada, Kanagawa (JP); Yuko Fujihira, Kanagawa (JP); Hiroyuki Mori, Kanagawa (JP); Tsutomu Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 10/596,114

(22) PCT Filed: Nov. 29, 2004

(86) PCT No.: PCT/JP2004/017728

§ 371 (c)(1),
(2), (4) Date: May 31, 2006

(87) PCT Pub. No.: WO2005/054373

PCT Pub. Date: Jun. 16, 2005

(65) Prior Publication Data

US 2007/0270527 A1 Nov. 22, 2007

(30) Foreign Application Priority Data

Dec. 2, 2003 (JP) ............................. P2003-403475
Dec. 2, 2003 (JP) ............................. P2003-403476
Dec. 2, 2003 (JP) ............................. P2003-403477

(51) Int. Cl.
*C08K 5/524* (2006.01)

(52) U.S. Cl. ..................... 524/127; 524/140; 524/429; 524/436; 524/437

(58) Field of Classification Search .................. 524/127, 524/140, 436, 437, 429
See application file for complete search history.

(56) References Cited

U.S. PATENT DOCUMENTS

| | | | |
|---|---|---|---|
| 2002/0151631 A1* | 10/2002 | Yoshida et al. | 524/429 |
| 2005/0143502 A1* | 6/2005 | Yamada et al. | 524/115 |
| 2007/0257239 A1* | 11/2007 | Yamada et al. | 252/601 |

FOREIGN PATENT DOCUMENTS

| | | |
|---|---|---|
| JP | 2002-302568 | 10/2002 |
| JP | 2002-338816 | 11/2002 |
| JP | 2003-89721 | 3/2003 |
| JP | 2003-165917 | 6/2003 |
| JP | 2003-192925 | 7/2003 |
| JP | 2003-327842 | 11/2003 |

* cited by examiner

*Primary Examiner*—Peter Szekely
(74) *Attorney, Agent, or Firm*—Sonnenschein Nath & Rosenthal LLP

(57) ABSTRACT

Disclosed is a biodegradable resin composition containing at least one biodegradable organic high molecular compound, a flame retardant additive containing a phosphorus-containing compound, and a hydrolysis suppressing agent suppressing the hydrolysis of the at least one biodegradable organic high molecular compound. An aliphatic polyester resin is polylactic acid, polycaprolactone, polyhydroxy lactic acid, polyhydroxy valeric acid, polyethylene succinate, polybutylene succinate, polybutylene adipate, polymalic acid, polyesters synthesized by fermentation, or a copolymer containing at least one of them. A polysaccharide is cellulose, starch, chitin, chitosan, dextrane, a derivative of at least one of them, or a copolymer containing at least one of them.

27 Claims, No Drawings

RESIN COMPOSITION, MOLDED PRODUCT FROM RESIN COMPOSITION AND METHOD FOR PREPARING RESIN COMPOSITION

TECHNICAL FIELD

This invention relates to a biodegradable resin composition, a molded product and an electrical product prepared from this resin composition, and to a method for preparation of the resin composition.

The present invention contains subject matter related to Japanese Patent Applications 2003-403-475, 2003-403-476 and 2003-403-477, filed in the Japanese Patent Office on Dec. 2, 2003, the entire contents of which being incorporated herein by reference.

BACKGROUND ART

Recently, a large variety of synthetic resin materials have been developed and marketed and are being used in ever increasing numbers in many industrial fields. The result is that the quantity of the synthetic resin discarded is increasing, and its disposal has become a serious social problem. If directly incinerated, the discarded resin yields toxic gases or damages an incineration furnace due to significant heat of combustion to impart severe load on the environment.

Among known processing methods for disposal of the wasted resins, there are a method consisting in incinerating the wasted resin after turning the wasted resin into low molecular material by pyrolysis or chemical decomposition, and a method consisting in using the wasted resin for land-filling. However, the processing by incineration is accompanied by emission of carbon dioxide and hence may give rise to global warming. Moreover, if sulfur, nitrogen or halogens are contained in the incinerated resin, toxic emission gases, generated on incineration, may prove a cause of pollution of atmospheric air. On the other hand, in case the resin currently in use is discarded after use and used for land-filling, most of the resin is left without being decomposed for prolonged time, thus causing soil pollution.

In order to cope with this problem, manufacture and usage of plastics, mainly composed of bio-cellulose, derived from natural materials, or starch, natural polyester by fermentation, cellulose based esters of low substitution degree, natural polyesters by fermentation, or aliphatic polyester resins by chemical synthesis, are under investigations as biodegradable plastics. The biodegradable resins are biochemically decomposed by microorganisms into carbon dioxide and water, for example. Thus, even if these biodegradable resins are discarded in the environment, they are readily decomposed into low molecular weight compounds innocuous to environment. Hence, the use of biodegradable resins decreases the adverse effect of disposal on global environment. For these reasons, researches into the use of the biodegradable resins for disposable products, centered about sundries for our everyday life, goods of hygiene or toys, are currently underway.

The state-of-the-art biodegradable resins are satisfactory from the perspective of safety to environment, as discussed above. However, the state-of-the-art biodegradable resins are not satisfactory as regards flame retardant performance, the demand for which is increasing from the viewpoint of safety in putting the resins to actual use. In particular, in the case of electrical products, there is a demand for facilitating post-recovery processing thereof by forming the casing from the biodegradable resin. However, for use as a casing for an electrical product, the material used must comply with the prescriptions for flame retardant properties as provided for in the Japanese Industrial Standard (JIS) or in the UL Standard (Underwriter Laboratory Standard). The biodegradable resins, currently in use, are not up to the prescriptions for flame retardant properties.

Moreover, when the biodegradable resins are applied to, for example, practical articles, such as casings of electronic equipment, the resins are required to exhibit high flame retardant properties and durability under high temperature high humidity conditions. For example, with a portable audio product, for example, it is required that physical properties, such as strength, shall be maintained for three to seven years under the conditions of a temperature of 30° C. and a relative humidity of 80%.

A variety of researches have so far been conducted in order to confer physical properties suited to practical molded products on the biodegradable resins. For example, a method consisting in blending a suitable amount of a biodegradable resin, displaying the properties, similar to those of rubber having a low glass transition temperature, to the aliphatic polyester resins, as typical of the biodegradable polymer, for improving biodegradability and moldability, has been proposed as a first technique. A method consisting in adding calcium carbonate and/or magnesium carbonate to the aliphatic polyester resins, for improving the mechanical strength, has also been proposed as a second technique. In addition, a method consisting in melting poly-3-hydroxy lactic acid, followed by quenching and solidifying to form a molded product having a degree of crystallinity less than 50%, for improving biodegradability, has been proposed as a third technique.

The molded products, formed of the biodegradable resins, so far proposed, are presupposed to be mainly used for films or packaging materials, while sufficient precautions have not been taken as to flame retardant performance or to preservation characteristics.

DISCLOSURE OF THE INVENTION

Problems to be Solved by the Invention

It is an object of the present invention to provide a resin composition, capable of removing the problems of the related art, molded products and electrical products employing this resin composition, and a method for producing the resin composition.

It is another object of the present invention to provide a resin composition with which high flame retardant properties as required of the casing material of electrical products and preservation characteristics may be achieved simultaneously, a method for producing the resin composition, a molded product of the resin composition, and electrical products employing the molded product.

The present inventors have conducted various investigations towards improving the physical properties of the biodegradable resins, in order to improve the problems of the related art and to achieve physical properties of the biodegradable resins, and have found that flame retardant performance of the biodegradable resins may be improved by admixing the flame retardant additive to the biodegradable resin. As typical of the flame retardant additives are halogen-based flame retardant additives. However, the biodegradable resin, containing the halogen-based flame retardant additives, yield halogen gases, on incineration, and complex processing is required in order to make the halogen gases innocuous to the human being.

The present inventors have conducted eager searches towards finding a novel flame retardant additive. Based on these researches, the present inventors have found that, when a phosphorus-containing compound, containing phosphorus atoms in the molecule, is combined with a biodegradable resin, the resulting product acts as a superior flame retardant additive, and may be used as a flame retardant additive which takes environmental protection into account. The present inventors have found that, if a hydrolysis suppressing agent is further contained in the resulting product, preservation characteristics may also be improved. The above finding has led to completion of the present invention.

A resin composition according to the present invention comprises at least one biodegradable organic high molecular weight compound, a flame retardant additive containing a phosphorus-containing compound, and a hydrolysis suppressing agent suppressing hydrolysis of the at least one organic high molecular weight compound.

A molded product according to the present invention is obtained on molding a resin composition comprising at least one biodegradable organic high molecular weight compound, a flame retardant additive containing a phosphorus-containing compound, and a hydrolysis suppressing agent suppressing hydrolysis of the at least one organic high molecular weight compound.

An electrical product according to the present invention includes, as its constituent, a molded product obtained on molding a resin composition comprising at least one biodegradable organic high molecular weight compound, a flame retardant additive containing a phosphorus-containing compound, and a hydrolysis suppressing agent suppressing hydrolysis of the at least one organic high molecular weight compound.

A method for producing the resin composition of the present invention produces the resin composition by compounding at least one biodegradable organic high molecular weight compound, a flame retardant additive containing a phosphorus-containing compound, and a hydrolysis suppressing agent suppressing hydrolysis of the at least one organic high molecular weight compound.

With the resin composition of the present invention, in which the phosphorus-containing compound is contained in the biodegradable organic high molecular weight compound, the dehydrating action and the heat shielding effect proper to charring act synergistically when the biodegradable organic high molecular weight compound is subjected to elevated temperatures, thus conferring high flame retardant properties to the biodegradable organic high molecular weight compound.

Moreover, with the resin composition of the present invention, added by the hydrolysis suppressing agent, suppressing the hydrolysis, the rate of hydrolysis of the biodegradable organic high molecular weight compound is slowed down, as a result of which high mechanical strength may be maintained for a time longer than in case no hydrolysis suppressing agent is added. Thus, with the resin composition of the present invention, containing the biodegradable organic high molecular weight compound and the specified flame retardant additive as well as the hydrolysis suppressing agent, both the flame retardant properties and preservation characteristics may be satisfied simultaneously.

The present invention has been completed on the basis of the information that, when combined with the biodegradable resin, the flame retardant additive containing the hydroxide and the phosphorus-containing may act as a superior flame retardant additive, and may be used as a flame retardant additive which also takes account of environmental protection, and that, if a hydrolysis suppressing agent is further contained in the resulting product, preservation characteristics may also be improved.

Another resin composition according to the present invention comprises at least one biodegradable organic high molecular weight compound, a flame retardant additive containing a phosphorus-containing compound and a hydroxide, and a hydrolysis suppressing agent suppressing hydrolysis of the at least one biodegradable organic high molecular weight compound.

Another molded product according to the present invention is obtained on molding at least one biodegradable organic high molecular weight compound, a flame retardant additive containing a phosphorus-containing compound and a hydroxide, and a hydrolysis suppressing agent suppressing hydrolysis of the at least one organic high molecular weight compound.

Another electrical product according to the present invention includes, as its constituent, a molded product obtained on molding at least one biodegradable organic high molecular weight compound, a flame retardant additive containing a phosphorus-containing compound and a hydroxide, and a hydrolysis suppressing agent suppressing hydrolysis of the at least one organic high molecular weight compound.

Another method for producing the resin composition of the present invention produces the resin composition by compounding at least one biodegradable organic high molecular weight compound, a flame retardant additive containing a phosphorus-containing compound and a hydroxide, and a hydrolysis suppressing agent suppressing hydrolysis of the at least one organic high molecular weight compound.

With the other resin composition of the present invention, in which the hydroxide is added as flame retardant additive to the biodegradable organic high molecular weight compound, the hydroxide displays a flame retardant effect by the endothermic effect and by generation of water on decomposition, when the biodegradable organic high molecular weight compound is subjected to elevated temperatures, thus conferring high flame retardant properties to the biodegradable organic high molecular weight compound.

With the other resin composition of the present invention, in which the phosphorus-containing compound is further added to the biodegradable organic high molecular weight compound, the dehydrating action and the heat shielding effect act synergistically, when the biodegradable organic high molecular weight compound is subjected to elevated temperatures thus conferring high flame retardant properties to the biodegradable organic high molecular weight compound.

Moreover, with the other resin composition of the present invention, added by the hydrolysis suppressing agent, suppressing the hydrolysis, the rate of hydrolysis of the biodegradable organic high molecular weight compound is slowed down, as a result of which high mechanical strength may be maintained for a time longer than in case no hydrolysis suppressing agent is added. Thus, with the resin composition of the present invention, containing the biodegradable organic high molecular weight compound and specified flame retardant additive as well as hydrolysis suppressing agent, both the flame retardant properties and preservation characteristics may be satisfied simultaneously.

The present invention has been completed on the basis of the information that, when combined with the biodegradable resin, the phosphorus-containing compound and the hydroxide may act as a superior flame retardant additive, and may be used as a flame retardant additive which also takes account of environmental protection, and that, if a hydrolysis suppressing agent is further contained in the composition, preservation characteristics may also be improved.

A further resin composition according to the present invention comprises at least one biodegradable organic high molecular weight compound, a flame retardant additive containing a phosphorus-containing compound and a hydroxide, and a hydrolysis suppressing agent suppressing hydrolysis of the at least one biodegradable organic high molecular weight compound.

A further molded product according to the present invention is obtained on molding at least one biodegradable organic high molecular weight compound, a flame retardant additive containing a phosphorus-containing compound and a hydroxide, and a hydrolysis suppressing agent suppressing hydrolysis of the at least one organic high molecular weight compound.

A further electrical product according to the present invention includes, as its constituent, a molded product obtained on molding at least one biodegradable organic high molecular weight compound, a flame retardant additive containing a phosphorus-containing compound and a hydroxide, and a hydrolysis suppressing agent suppressing hydrolysis of the at least one organic high molecular weight compound.

A further method for producing the resin composition of the present invention produces the resin composition by compounding at least one biodegradable organic high molecular weight compound, a flame retardant additive containing a phosphorus-containing compound and a hydroxide, and a hydrolysis suppressing agent suppressing hydrolysis of the at least one organic high molecular weight compound.

With the further resin composition of the present invention, in which the flame retardant additive containing the nitrogen compound and the hydroxide is contained in the biodegradable organic high molecular weight compound, the flame retardant effect proper to the hydroxide and the flame retardant effect proper to the nitrogen-containing combustion obstructive gas, generated when the biodegradable organic high molecular weight compound is subjected to elevated temperatures, act synergistically, thus conferring high flame retardant properties to the biodegradable organic high molecular weight compound.

Moreover, with the further resin composition of the present invention, added by the hydrolysis suppressing agent, suppressing the hydrolysis, the rate of hydrolysis of the biodegradable organic high molecular weight compound is slowed down, as a result of which high mechanical strength may be maintained for a time longer than in case no hydrolysis suppressing agent is added. Thus, with the further resin composition of the present invention, containing the biodegradable organic high molecular weight compound and the specified flame retardant additive as well as the hydrolysis suppressing agent, both the flame retardant properties and preservation characteristics may be satisfied simultaneously.

With the above-described resin compositions, extremely high flame retardant properties, satisfying the range of V-0 to V-1 of the UV prescriptions, and superior preservation characteristics sufficient to allow the resin composition usable as a casing for an electrical product, may be achieved simultaneously. Moreover, when discarded, the resin compositions affect the environment only to a lesser extent.

Other objects and specified advantages of the present invention will become more apparent from the following explanation which will now be made in conjunction with the drawings.

BEST MODE FOR CARRYING OUT THE INVENTION

The resin composition, the method for preparing the resin composition, and molded products as well as electrical components, fabricated from the resin composition, will now be described.

Initially, as the resin composition, according to the present invention, a resin composition containing a biodegradable organic high molecular weight compound, a phosphorus-containing compound, operating as a flame-retardant additive, and a hydrolysis suppressing agent, controlling the rate of hydrolysis of the biodegradable organic high molecular weight compound, will be described.

In the following explanation, the biodegradable organic high molecular weight compound, sometimes abbreviated below to the biodegradable high molecular weight compound, means such compound as is decomposed after use into low molecular weight compounds, that is, ultimately decomposed into water and carbon dioxide by participation of microorganisms in nature (Biodegradable Plastics Study Group, ISO/TC-207/SC3). As the biodegradable organic high molecular weight compounds, biodegradable resins, such as aliphatic polyester resins, polysaccharides, peptides, polyvinyl alcohol, polyamides or polyalkylene glycols, exhibiting biodegradable properties, and copolymers containing at least one of these compounds, are preferred. These may be used alone as the biodegradable organic high molecular weight compound. Or, they may be used in combination to derive their respective merits.

Out of the biodegradable organic high molecular weight compounds, biodegradable aliphatic polyester resins, exhibiting high mixing performance or volume producibility, are preferred. As the biodegradable aliphatic polyester resins, polylactic acids, such as poly-L-lactic acid (PLLA) or random copolymers of L-lactic acid and D-lactic acid, and derivatives thereof, are more preferred. Of course, those compounds classified under aliphatic polyesters, such as, for example, polycaprolactone, polyhydroxy lactic acid, polyhydroxy valeric acid, polyethylene succinate, polybutylene succinate, polybutylene adipate, polymalic acid, polyglycolic acid, polysuccinate, polyoxalate, polybutylene diglycolate, polydioxanone, polyesters synthesized by fermentation, or copolymers containing at least one of these compounds, may also be used. The polyesters synthesized by fermentation may be enumerated by 3-hydroxybutyrate (3HB), 3-hydroxyvalerate (3HV) and copolymers thereof. As the aliphatic polyester resins, the above compounds may be used either single or in combination.

As the biodegradable organic high molecular weight compounds, polysaccharides, higher in thermal resistance than the aliphatic polyester resins, may be used. Among polysaccharides, contained in the resin composition, there may be cellulose, starch, chitin, chitosan, dextran, derivatives thereof and copolymers containing at least one of these compounds. As the polysaccharides, the above compounds may be used alone or in combination. A variety of plasticizers may be added for conferring thermoplastic properties on the polysaccharides.

The esterified cellulose, used in the resin composition of the present embodiment, may be prepared by known methods. The esterified cellulose may be prepared by complete acetylation of cellulose followed by partial saponification. The esterified cellulose prepared is added by a plasticizer for improving its moldability. Although there is no particular limitation to the plasticizer provided that it has good biodegradability and high plasticizing performance, low molecular ester-based plasticizers are preferred and phosphates or carboxylates are more preferred.

Examples of the phosphates include triphenyl phosphate (TPP), tricresylphosphate (TCP), cresyl diphenyl phosphate, octyl diphenyl phosphate, diphenyl biphenyl phosphate, trioctyl phosphate and tributyl phosphate. Examples of carboxylates include phthalates and citrates. Concrete examples of the phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Concrete examples of the citrates include o-acetyl triethyl citrate (OACTE), o-acetyl tributyl citrate (OACTB), acetyl triethyl citrate and acetyl tributyl citrate.

Other examples of carboxylates include butyl oleate, methyl acetyl ricinolate and acetyl tributyl citrate.

Glycolates may also be used. The glycolates may be exemplified by triacetin, tributyrin, butyl phthalyl butyl glycolate, ethyl phthalyl ethyl glycolate, methyl phthalyl ethyl glycolate and butyl phthalyl butyl glycolate. Of these, triphenyl phosphate, tricresyl phosphate, cresyl diphenyl phosphate, tributyl phosphate, dimethyl phthalate, diethyl phthalate, dibuthyl phthalate, dioethyl phthalate, diethyl hexyl phthalate, triacetin and ethyl phthalyl ethyl glycolate are preferred. The plasticizers may be used either singly or in combination.

Starch-substituted derivatives, that are processed starch, may be prepared by known methods. The basic method for preparation of the starch-substituted derivatives, that are processed starch, is esterification. The starch ester, produced by this reaction, has so far been known as aqueous reaction esterified starch of low substitution degree (starch ester) (see pp. 550 of 'Starch Science Handbook', published by ASAKURA-SHOTEN on Jul. 20, 1997). As for the methods for preparing the starch ester of high substitution degree, there are, for example, a method of reacting an acid anhydride in pyridine using dimethyl aminopyridine or an alkali metal as a catalyst (pp. 332 to 336, "Starch Chemistry & Technology", by Wisler, published by Academic Press), and a method of carrying out the reaction in an acid anhydride at an elevated temperature of 100° C. or higher, with an aqueous solution of an alkali metal hydroxide as a solvent (see Japanese Patent Publication Kohyo H5-508185 and page 73, March issue, Die Starke 1972). There is also a method of 'carrying out a reaction in a non-aqueous organic solvent using vinyl ester' (see Japanese Laid-Open Patent Publication H8-188601). A natural fatty acid, for example, may also be added to starch, as feedstock, to carry out etherification and graft polymerizing reaction to yield a starch substituted derivative, as processed starch. Plasticizers may also be added in order to confer moldability (such as injection moldability, extrusion moldability or stretch moldability), comparable to those of ordinary thermoplastics (thermoplastic resins), to the starch substituted derivatives (starch ester).

The starch substituted derivative may also be such one exhibiting thermoplastic properties without addition of plasticizers or with use only of a minor quantity of plasticizers (see for example the Japanese Laid-Open Patent Publication 2000-159802). This Patent Publication discloses a starch-substituted derivative in which hydrogen on a reactive hydroxyl group on the same starch molecule is substituted by long-chain hydrocarbon containing groups of C6 to C24 and short-chain hydrocarbon containing groups and in which the substitution degrees of the long-chain hydrocarbon containing group and the short-chain hydrocarbon containing group are adjusted to exhibit self thermo-plasticity as biodegradability is maintained. In the present starch-substituted derivative, the case where both the long-chain hydrocarbon containing group and the short-chain hydrocarbon containing group are acyl groups is excluded.

As the plasticizers added to the starch, such as starch ester, those exhibiting high compatibility with respect to the starch ester are preferred. The following are examples of plasticizers, mainly ester type plasticizers, that may be used. For example, phthalate-based plasticizers may be enumerated by dimethyl phthalate, diethyl phthalate or dibutyl phthalate, ethyl phthaloyl ethyl glycolate, butyl phthaloyl butyl glycolate, and fatty acid based ester based plasticizers may be enumerated by methyl oleate, methyl adipate, butyl adipate, isopropyl adipate, methyl oleate, ethyl olepate, butyl olepate, isopropyl olepate, methyl stearate, ethyl stearate, butyl stearate, and isopropyl stearate. Polyhydric alcohol ester based plasticizers may be enumerated by sucrol acetate, diethyl glycol benzoate, triacetin (triacetyl glycerin), tripropionion (tripropionyl glycerin), and acetyl diglycerin. Oxy-acid ester based plasticizers may be enumerated by acetyl methyl ricinolate and acetyl triethyl citrate. Phosphate based plasticizers may be enumerated by tributyl phosphate and triphenyl phosphate. Epoxy based plasticizers may be enumerated by epoxylated soybean oil, epoxylated castor oil and alkyl epoxy stearate, and high molecular based plasticizers may be enumerated by a variety of liquid rubber, terpenes and linear polyesters. Of these, especially the ester based plasticizers, such as acetyl triethyl citrate, ethyl phthaloyl ethyl glycolate, triacetin or tripropionin, are preferably employed.

As peptides, collagen, casein, fibrin and gelatin, may be used, only by way of examples.

As polyamides, nylon 4, nylon 2/nylon 6 copolymers, for example, may be used.

Even those organic high molecular weight compounds, having biodegradability lowered at a high molecular weight from the value for a low molecular weight, but which is able to become biodegradable on e.g. graft copolymerization with the above exemplified biodegradable organic high molecular weight compound, may be used in the present embodiment. The organic high molecular weight compounds, having low biodegradability at a high molecular weight, may be exemplified by polyethylene, polyacrylic acid derivatives, polypropylene and polyurethane. There is no particular limitation to the molecular weight or terminal groups of these resins, provided that their mechanical strength is sufficient.

The biodegradable organic high molecular weight compound, used in the present embodiment, may be prepared by any suitable known methods. For example, a biodegradable aliphatic polyesters may, for example, be prepared by a lactide method, a method of polycondensation of polyhydric alcohol and polybasic acid, or a method of intermolecular polycondensation of hydroxyl carboxylic acid, having a hydroxyl group and a carboxylic group in a molecule. These methods are given only by way of illustration and are not to be interpreted as limitative of the present invention.

In the present embodiment, a phosphorus-containing compound, having a phosphorus atom in the molecule, is used as a flame-retardant additive. The phosphorus-containing compound, having the phosphorus atom in the molecule, may be compounded (added) to a compound mainly composed of a high molecular material, such as resin, by mixing or fixing. The phosphorus-containing compound, thus added as an additive, operates as a flame-retarder, a stabilizer and as an extender for imparting e.g. the flame-retardant performance, stability and increasing the volume of the biodegradable organic high molecular weight compound to which is added the additive. For example, if a high temperature of, for example, 500° C. or higher is given the compound to be added by the additive, the dehydrating action and the heat shielding effect ascribable to charring act synergistically to confer high flame retardant properties to the compound to be added by the additive. Specifically, high flame-retardant performance, satisfying the range from V-0 to V-1, may be imparted if evaluation is carried out by for example the UL94 combustibility test.

The flame-retardant performance obtained when the phosphorus-containing compound and the biodegradable high molecular weight compound are combined together is higher than that obtained when the phosphorus-containing compound and another resin are combined together. The reason is that the temperature of decomposition of the biodegradable high molecular weight compound is close to the temperature at which the phosphorus-containing compound operates as a flame retarder so that the biodegradable high molecular weight compound is more liable to be mixed with the phosphorus-containing compound.

Moreover, since the phosphorus-containing compound contains phosphorus, as a component of the living organism, there is a further beneficial aspect that the ecological system is affected by the compound to a lesser extent than by the pre-existing flame-retardant additive, such as halogen-based flame retarder.

As the phosphorus-containing compounds, organic phosphorus compounds, the element phosphorus or inorganic phosphorus compounds may be used. The organic phosphorus compounds may be enumerated by monomeric organic phosphorus compounds and polymeric organic phosphorus compounds. The monomeric organic phosphorus compounds may be enumerated by organic phosphonates, organic phosphinates, organic phosphates, phosphoric esters, phosphorous esters, phosphine oxide, hypophosphorous esters that may be substituted by phosphine oxide, alkyl group and/or aryl group, such as 9,10-dihydro-9-oxa-10phosphor phenanthrene-10-oxide, phosphono carboxylates, nitrogen-containing phosphoric esters, ammonium salts of acidic aliphatic phosphoric esters, and salts of amine-containing compounds. The aforementioned phosphoric esters may be enumerated by aliphatic phosphoric esters, aromatic phosphoric esters, such as triphenyl phosphate, and aliphatic-aromatic phosphoric esters. The phosphorous esters may be exemplified by aromatic phosphorous esters, aliphatic phosphorous esters and aliphatic-aromatic phosphorous esters.

The polymeric organic phosphorus compounds, out of the organic phosphorus compounds, may be exemplified by condensates of the monomeric organic phosphorous compounds, polymeric phosphoric esters containing hydroxyl groups, such as phenolic resins, polyphosphinic carboxylates, polyphospphonic acid amides and phosphasen compounds.

The condensates may be exemplified by for example resorcinol phosphates, hydrochinone phosphates, biphenol phosphates and bisphenol phosphates.

An example of the element phosphorus is red phosphorus. The inorganic phosphorus compound may be exemplified by polyphosphates, phosphates and surface-processed compounds of red phosphorus. The phosphates are derived from phosphoric acid exemplified by ortho phosphoric acid, phosphorous acid, polyphosphoric acid, polyphosphorous acid (metaphosphorous acid and pyrophosphorous acid). The salts of the phosphates may be enumerated by alkali metal salts, such as magnesium or calcium salts, aluminum salts, ammonium salts and amine salts.

Meanwhile, the organic compounds, the element phosphorus and the inorganic phosphorus compound include salts of the organic or inorganic phosphoric acid with metals or with amine-containing compounds. The organic or inorganic phosphoric acid may be substituted by alkyl and/or aryl groups. The phosphorus containing compounds may be any of the above compounds used alone or in combination.

The amount of addition of the phosphorus containing compound is preferably such that the proportion of phosphorus atoms in the phosphorus containing compound accounts for not more than 20 parts by weight to 100 parts by weight based on the weight of an ultimate composition composed of the resin, the phosphorus containing compound, flame retarder, hydrolysis suppressing agent and other additives. In case the amount of addition exceeds the upper limit, given above, desired physical properties of the resin cannot be achieved.

There is no particular limitation to the hydrolysis suppressing agent, used in the present embodiment, provided that it is an additive capable of suppressing the hydrolysis of the biodegradable high molecular weight compound. If the hydrolysis suppressing agent, suppressing the hydrolysis of the biodegradable high molecular weight compound, is contained in the resin, the rate of the hydrolysis of the biodegradable high molecular weight compound is delayed, as a result of which high preservation characteristics may be displayed, such that high mechanical strength and impact strength may be maintained for prolonged time.

Specified hydrolysis suppressing agents may be exemplified by compounds exhibiting reactivity with active hydrogen contained in the biodegradable high molecular weight compound. By adding the above compound, it becomes possible to reduce the amount of active hydrogen in the biodegradable high molecular weight compound to prevent the biodegradable high molecular chain from being catalytically hydrolyzed by the active hydrogen. The active hydrogen herein means hydrogen in the bond of oxygen or nitrogen with hydrogen (N—H or O—H bond), this hydrogen being higher in reactivity than hydrogen in the carbon-hydrogen bond (C—H bond). More specifically, the active hydrogen is present in for example the carboxylic group —COOH, a hydroxy group —OH, an amino group —NH2 or in an amido linkage —NHCO— in the biodegradable high molecular weight compound.

The compound having reactivity to the active hydrogen in the biodegradable high molecular weight compound may be exemplified by a carbodiimide compound, an isocyanate compound and an oxazoline compound. In particular, the carbodiimide compound is desirable since the compound may be melted and kneaded with the biodegradable high molecular weight compound and addition of a minor quantity thereof is sufficient to suppress hydrolysis effectively.

The carbodiimide compound contains one or more carbodiimide groups in the molecule and may be exemplified by a polycarbodiimide compound. For preparing the carbodiimide compound, such a method may be used which consists in using, as a catalyst, an organic phosphorus based compound, such as o,o-dimethyl-o-(3-methyl-4-nitrophenyl)phosphorthioate, o,o-dimethyl-o-(3-methyl)-4-(methylthio)phenyl) phosphorothioate, o,o-diethyl-o-2-isopropyl-6-methylpyrimidine-4-il phosphorothioate, or an organometal compound, such as a rhodium complex, a titanium complex, a tungsten complex or a palladium complex, and in subjecting a variety of polyisocyanates to decarbonating polycondensation in the absence of a solvent or in the presence of inert solvents, such as hexane, benzene, dioxane or chloroform, at a temperature approximately 70° C. or higher.

A monocarbodiimide compound, contained in the carbodiimide compound, may be exemplified by, for example, dicyclohexyl carbodiimide, diisopropyl carbodiimide, dimethylcarbodiimide, diisopropyl carbodiimide, dioctyl carbodiimide, diphenylcarbodiimide and naphthyl carbodiimide. Of these, dicyclehexyl carbodiimide or isopropyl carbodiimide, available readily industrially, are most preferred.

The isocyanate compounds, exhibiting reactivity to active hydrogen in the biodegradable high molecular weight compound, may be enumerated by, for example, 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydro naphthalene diisocyanate, tetramethylene diisocyanate, 1,6-hexamethylene diisocyanate, dodecamethylene diisocyanate, trimethyl hexamethylene diisocyanate, 1,3-cyclohexylene diisocyanate, 1,4-cyclohexylene diisocyanate, xylylene diisocyanate, tetramethyl xylylene diisocyanate, hydrogenated xylylene diisocyanate, lysine diisocyanate, isophorone diisocyanate, 4,4'-dicyclohexyl methane diisocyanate or 3,3'-dimethyl-4,4'-dicyclohexyl methane diisocyanate.

The isocyanate compound may readily be prepared by known methods, or commercial products may be used. As typical of the commercial polyisocyanate compounds are CORONATE (a trade name of hydrogenated diphenyl methane diisocyanate by NIPPON POLYURETHANE Co. Ltd.) and MILLIONATE (a trade name of an aromatic diisocyanate adduct by NIPPON POLYURETHANE Co. Ltd.). If, in particular, the composition of the present embodiment is to be prepared by melt kneading, it is more preferred to use a solid polyisocyanate compound, than a liquid compound. In the solid polyisocyanate compounds used, a polyisocyanate compound, in which an isocyanate group is blocked by a masking agent, such as polyhydric aliphatic alcohol or an aromatic polyol, is preferred.

The oxazoline-based compound, reactive with active hydrogen in the biodegradable high molecular weight compound, may be enumerated by 2,2'-o-phenylenebis(2-oxazoline), 2,2'-m-phenylenebis(2-oxazoline), 2,2'-p-phenylenebis(2-oxazoline), 2,2'-p-phenylenebis(4-methyl-2-oxazoline), 2,2'-m-phenylenebis(4-methyl-2-oxazoline), 2,2'-p-phenylenebis(4,4'-dimethyl-2-oxazoline), 2,2'-m-phenylenebis(4,4'-dimethyl-2-oxazoline), 2,2'-p-ethylenebis(2-oxazoline), 2,2'-p-tetramethylenebis(2-oxazoline), 2,2'-hexamethylenebis(2-oxazoline), 2,2'-octamethylenebis(2-oxazoline), 2,2'-ethylenebis(4-methyl-2-oxazoline), or 2,2'-diphenylenebis(2-oxazoline). As the hydrolysis suppressing agent, the above compounds may be used either single or in combination.

There is no particular limitation to the sorts or the amount of the hydrolysis suppressing agent used. These may be determined depending on the ultimate product because the rate of biodegradation of the molded product and hence the mechanical strength may be adjusted by suitably adjusting the sorts or the amounts of the hydrolysis suppressing agent used.

There is no limitation to the method for preparing the resin compound of the present embodiment such that any suitable known methods may be used. The method for preparing the resin composition by melt kneading the flame retarder and the hydrolysis suppressing agent to the biodegradable organic high molecular weight compound may be recited as a suitable method.

In the method for preparation by melt kneading, the flame retarder and the hydrolysis suppressing agent are added or mixed before or when melting the biodegradable organic high molecular weight compound. The flame retarder and the hydrolysis suppressing agent may be added separately or simultaneously. If the flame retarder and the hydrolysis suppressing agent are added separately, any one of them may be added initially. In an alternative method, the biodegradable organic high molecular weight compound is melted and thereafter the flame retarder or the hydrolysis suppressing agent is added and mixed. The resulting composition is re-melted together and the remaining one of the hydrolysis suppressing agent and the flame retarder is added and mixed.

Other suitable additives may be used in the resin composition of the present embodiment, for improving its performance, as long as such addition is not contrary to the object of the present invention. These other additives include, in addition to reinforcements, anti-oxidants, thermal stabilizers and UV ray absorbers, lubricants, waxes, coloring matter, crystallization accelerators, anti-dripping agents and degradable organic substances, such as starch, only by way of examples. These additives may be used either alone or in combination.

The reinforcements may be enumerated by, for example, fillers, such as inorganic and organic fillers. The inorganic fillers may include, in addition to carbon and silicon dioxide, fine particles of metal oxides, such as alumina, silica, magnesia or ferrite, silicates, such as talcum, mica, kaolin, zeolite or wollastonite, and fine particles of barium sulfate, calcium carbonate or fullerene. The inorganic fillers may include glass micro-beads, carbon fibers, chalk, quartz, such as novoculite, asbestos, feldspar and mica. The organic fillers may include epoxy resin, melamine resin, urea resin, acrylic resin, phenolic resin, polyimide resin, polyester resin or Teflon (trademark). Above all, silicon dioxide is preferred. It is noted that the reinforcements are not limited to the above-mentioned substances and routinely used fillers, such as inorganic or organic fillers, may be used. The above substances may be used alone or in combination as the reinforcements.

The anti-oxidants may be enumerated by, for example, phenol-based compounds, amine-based compounds, phosphorus-based compounds, sulfur-based compounds, hydroquinone-based compounds and quinoline-based compounds. Among the phenol-based compounds, there are hindered phenols, for example, $C_{2-10}$ alkylenediol-bis[3-(3,5-di-branched $C_{3-6}$alkyl-4-hydroxyphenyl)propionates, such as 2,6-di-t-butyl-p-cresol, 1,3,5-trimethyl-2,4,6-tris (3,5-di-t-butyl-4-hydroxybenzyl)benzene, 2,2'-methylenebis(4-methyl-6-t-butylphenol), 4,4'-methylenebis(2,6-di-t-butylphenol), 4,4'-bythylidenebis(3-methyl-6-t-butylphenol), 1,6-hexanediol-bis[3-(3,5-di-t-butyl-4-hyroxyphenyl)propionate], di- or trioxy $C_{2-4}$alkylenediol-bis[3-(3,5-di-branched $C_{3-6}$alkyl-4-hydroxyphenyl)propionate], such as triethylene glycol-bis[3-(3-t-butyl-5-methyl-4-hydroxyphenyl)propionate], $C_{3-8}$ alkanetriol-bis[3-(3,5-di-branched $C_{3-6}$ alkyl-4-hydroxyphenyl)propionate], such as glycerin tris[3-(3,5-di-t-butyl-4-hydroxyphenyl)propionate, and $C_{4-8}$ alkantetraol tetrakis[3-(3,5-d-branched $C_{3-6}$alkyl-4-hydroxyphenyl)propionates, such as pentaerythritol tetrakis[3-(3,5-di-t-butyl-4-hydroxyphenyl)propionate. There are also n-octadecyl-3-(4',5'-di-t-butylphenyl)propionate, n-octadecyl-3-(4'-hydroxy-3',5'-di-t-butylphenol)propionate, stearyl-2-(3,5-di-t-butyl-4-hydroxyphenol)propionate, distearyl-3,5-di-t-butyl-4-hydroxybenzylphosphate, 2-t-butyl-6-(3-t-butyl-5-methyl-2-hydroxybenzyl)-4-methylphenylacrylate, N,N'-hexamethylenebis(3,5-di-t-butyl-4-hydroxyl-hydroxyamide), 3,9-bis[2-[3-(3-t-butyl-4-hydroxy-5-methylphenyl)propionyloxy]1,1-dimethyl-lethyl]2,4,8,10- tetraoxaspiro[5,5]undecane, 4,4'-thiobis(3-methyl-6-t-butylphenol), and 1,1,3-tris(2-methyl-4-hydroxy-5-t-butylphenol)butane.

Among the amine-based anti-oxidants, there are, for example, phenyl-1-naphtylamine, phenyl-2-naphtylamine, N,N'-diphenyl-1,4-phenylenediamine, and N-phenyl-N'-cyclohexyl-1,4-phenylenediamine.

Among the phosphorus-based anti-oxidants, there are, for example, phosphite compounds, such as tridecyl phosphite, triphenyl phosphite, tris nonylphenyl phosphite, diphenyl isodecyl phosphite, phenyl diisodecyl phosphite, 2,2-methylenebis(4,6-di-t-butylphenyl)octyl phosphite, 4,4'-butylidenebis(3-methyl-6-t-butylphenyl)ditridecylphosphite, tris (2,4-di-t-butylphenyl)phosphite, tris(2-t-butyl-4-methylphenyl)phosphite, tris(2,4-di-t-amylphenyl) phosphite, tris(2,t-butylphenyl)phosphite, bis(2-t-butylphenyl)phenylphosphite, tris[2-(1,1-dimethylpropyl)-phenyl]phosphite, tris[2,4-(1,1-dimethylpropyl)-phenyl] phosphite, tris(2-cyclohexylphenyl)phosphite, and tris(2-t-butyl-4-phenylphenyl)phosphite. There are also phosphine compounds, such as triethyl phosphine, tripropyl phosphine, tributyl phosphine, tricyclohexyl phosphine, diphenyl phosphine, allyldiphenyl phosphine, triphenyl phosphine, methylphenyl-p-anisylphosphine, p-anisyldiphenyl phosphine, p-tolyldiphenyl phosphine, di-p-anisylphenyl phosphine, di-p-tolylphenyl phosphine, tri-m-aminophenyl phosphine, tri-2,4-dimethylphenyl phosphine, tri-2,4,6-trimethylphenyl phosphine, tri-o-anisylphosphine, tri-p-anisylphosphine, and 1,4-bis(diphenylphosphino)

As typical of the hydroquinone-based anti-oxidants is 2,5-di-t-butyl hydroquinone. As typical of the quinoline-based anti-oxidants is 6-ethoxy-2,2,4-trimethyl-1,2-dihydroquinone. As typical of the sulfur-based anti-oxidants, there are dilauryl thiopropionate and distearyl thiopropionate. Most preferred as anti-oxidants are phenolic anti-oxidants, in particular hindered phenols, such as polyol-poly[(branched $C_{3-6}$ alkyl group and hydroxyl group substituted phenyl)propionate]. The anti-oxidants may be used either lone or in combination.

The thermal stabilizers may be enumerated by, for example, nitrogen-containing compounds, such as basic nitrogen-containing compounds, e.g. polyamide, poly-.beta.-alanine copolymers, polyacrylamide, polyurethane or melamine-formamide condensates, metal salts of organic carboxylic acids, such as calcium stearate or 12-hydroxy calcium stearate, metal oxides, such as magnesium oxide, calcium oxide or aluminum oxide, metal hydroxides, such as magnesium hydroxide, calcium hydroxide or aluminum hydroxide, alkali or alkali earth metal containing compounds, such as metal carbonates, zeolite and hydrotalcite. In particular, the alkali or alkali earth metal containing compounds, inter alia the alkali earth metal containing compounds, such as magnesium or calcium compounds, zeolite and hydrotalcite, are preferred. These thermal stabilizers may be used either alone or in combination.

The UV light absorbers may be enumerated by known compounds, such as benzophenone-based, benzotriazole-based, cyano acrylate based, salicylate-based or succinic acid anilide based compounds. Example of these compounds include [2-hydroxy-4-(methacryloyloxyethoxy)benzophenone]-methyl methacrylate copolymers, [2-hydroxy-4-(methacryloyloxymethoxy)benzophenone]-methyl methacrylate copolymers, [2-hydroxy-4-(methacryloyloxyoctoxy)benzophenone]-methyl methacrylate copolymers, [2-hydroxy-4-(methacryloyloxy dodesiloxy)benzophenone]-methyl methacrylate copolymers, [2-hydroxy-4-(methacryloyloxy benzyloxy)benzophenone]-methyl methacrylate copolymers, [2,2'-dihydroxy-4-(methacryloyloxyethoxy)benzophenone]-methyl methacrylate copolymers, [2,2'-hydroxy-4-(methacryloyloxyethoxy)benzophenone]-methyl methacrylate copolymers, and [2,2'-hydroxy-4-(methacryloyloxyoctoxy benzophenone)]-methyl methacrylate copolymers. These UV light absorbers may be used alone or in combination.

The lubricants may be enumerated by, for example, petroleum-based lube oils, such as fluid paraffin, synthetic lube oils, such as halogenated hydrocarbons, diester oils, silicon oils or fluorine silicon, a variety of modified silicon oils, such as epoxy-modified, amino-modified, alkyl-modified or polyether-modified silicon oils, silicon-based lubricating materials, such as copolymers of organic compounds, e.g. polyoxyalkylene glycol, and silicon, silicon copolymers, a variety of fluorine-based surfactants, such as fluoro alkyl compounds, fluorine-based lubricating materials, such as trifluoromethylene chloride low polymers, waxes, such as paraffin wax or polyethylene wax, higher aliphatic alcohols, higher aliphatic amides, higher fatty acid esters, higher fatty acid salts, and molybdenum disulfide. Of these, silicon copolymers, specifically, resins to which is polymerized silicon by block or graft polymerization, are particularly preferred. As the silicon copolymers, those obtained on graft or block copolymerization of silicon to acrylic resins, polystyrene resins, polynitrile resins, polyolefinic resins, epoxy resins, polybutyral resins, melamine resins, vinyl chloride based resins, polyurethane resins or polyvinyl ether resins, may be used. It is preferred to use the silicon graft copolymers. These lubricants may be used either alone or in combination.

The waxes may be enumerated by olefinic waxes, such as polypropylene wax or polyethylene wax, Fischer Tropsch wax, micro-crystalline wax, montan wax, aliphatic acid amide based wax, higher aliphatic alcohol based wax, higher fatty acid based wax, higher acid ester based wax, carnauba wax, and rice wax. These waxes may be used either singly or in combination.

The coloring matter may be enumerated by inorganic pigments, organic pigments and dyes. The inorganic pigments may be enumerated by, for example, chromium-based pigments, cadmium-based pigments, iron-based pigments, cobalt-based pigments, Ultramarine, and Prussian blue. Specified examples of the organic pigments or dyes may be enumerated by, for example, carbon black, phthalocyanine pigments, such as phthalocyanine copper, quinacridone pigments, such as quinacridone magenta or quinacridone red, azo pigments, such as, for example, Hansa Yellow, disazo yellow, permanent yellow, permanent red or naphthol red, Nigrosin dyes, such as Spirit Black SB, Nigrosin base or Oil Black BW, Oil Blue, Pigment Yellow, Pigment Blue, Pigment Red and Alkali Blue. The coloring matter may be used either alone or in combination.

The crystallization accelerators may be enumerated by organic salts, such as, for example, p-t-sodium butyl benzoate, sodium montanate, calcium montanate, sodium palmitate, and calcium stearate, inorganic salts, such as, for example, calcium carbonate, calcium silicate, magnesium silicate, calcium sulfate, barium sulfate and talcum, and metal oxides, such as zinc oxide, magnesium oxide and titanium oxide. These crystallization accelerators may also be used alone or in combination.

As the anti-dripping agents, thermosetting resins, such as fluorine resins or phenolic resins, may be used. Examples of the fluorine resins may include fluorine-containing monomers, such as tetrafluoroethylene, chlorotrifluoroethylene, vinylidene fluoride, hexafluoropropylene, and perfluoroalkyl vinyl ether. These may be used either by itself or as a copolymer. Other examples include copolymers of the above fluorine-containing monomers with copolymerizable monomers, such as ethylene, propylene or (meth)acrylates. These anti-dripping agents may be used either alone or in combination.

The resin composition of the present embodiment may be processed in known manner. For example, the resin composition may be irradiated with active energy rays for suppressing hydrolysis of the biodegradable high molecular weight compound contained in the resin composition.

The sources of active energy rays may be enumerated by, for example, electromagnetic waves, electron beams, corpuscular radiation, and combinations thereof. The electromagnetic waves may be enumerated by ultraviolet radiation (UV radiation) and X-rays, while the corpuscular radiation may be enumerated by radiation of corpuscles, such as protons and neutrons. In particular, irradiation with electron beam by an electron accelerator is desirable.

The active energy rays may be illuminated using known illuminating units, such as, for example, UV illuminating devices or electron accelerators. These is no particular limitation to the exposure and intensity of exposure as long as hydrolysis of the biodegradable high molecular weight compound may effectively be delayed with the exposure and intensity of exposure used for the resin composition of the present embodiment. In the case of electron beam, the acceleration voltage is desirably of the order of 100 to 5000 kV, while the exposure is desirably of the order of 1 kGy.

The molded products, obtained on molding the resin composition of the present embodiment, may be put to a variety of uses. The molding method, used for preparing molded products, may be enumerated by pressure forming, film forming, extrusion or injection molding. Of these, the injection molding is most desirable. Specifically, the injection molding is carried out as conventionally, using a uniaxial extruder, a multi-axial extruder or a tandem extruder. The injection molding may also be carried out, as conventionally, using known injection molding machines, such as an in-line screw injection extruder, a multi-layer injection molding machine or a double-head injection molding machine. There is no particular limitation to the methods for preparing molded products by molding the resin composition, and any of known molding methods may be used.

With the resin composition, containing the biodegradable organic high molecular weight compound, the phosphorus-containing compounds, displaying high flame-retardant properties, when combined with the biodegradable organic high molecular weight compound, and the hydrolysis suppressing agent, it is possible to achieve compatibility between extremely high flame retardant properties, satisfying the range of from V0 to V1, when evaluation is made by e.g. a UV combustibility test, and excellent preservation characteristics, which will sufficiently assure the use of the resin composition as a feedstock for a casing for an electrical product.

The molded product, formed of the resin composition of the present embodiment, is essentially composed of a biodegradable resin, which is a safe component for the living organism. This biodegradable resin may readily be decomposed in nature so that any adverse effects on the environment at the time of or after disposal may be diminished. Moreover, the flame-retardant additives, used in the present embodiment, exhibit high flame retardant properties and, after disposal, are decomposed into components which are not detrimental to the living organisms or the global environment, such as phosphorus, water or carbon dioxide. Hence, the flame-retardant additives do not have adverse influences on the environment or on the human being. When the molded products are used for casings or packaging materials of the electrical products, sufficient consideration has been taken for environmental protection as compared to the case of employing pre-existing synthetic resins or biodegradable resins.

The molded product, obtained on molding the resin composition of the present embodiment, may be applied with advantage as a component of each of the following electrical products for which it has so far been thought to be difficult to apply the biodegradable resin. Specified examples of the electrical products include stationary AV equipment, such as a DVD (Digital Versatile Disc) player, a CD (Compact Disc) player, an MD (Mini-Disc) player or an amplifier, loudspeakers, car-laden AV/IT equipment, PDA inclusive of electronic books, video decks, projectors, TV receivers, monitors, digital video cameras, digital still cameras, printers, radio receivers, radio receiver/tape recorder, a system stereo, microphone, headphone, keyboards, headphone stereo, portable CD players, portable MD players, portable audio devices, such as so-called silicon audio players, refrigerators, laundry machines, air conditioners, personal computers, peripherals of the personal computers, stationary TV game machines, mobile phones, facsimile machines, copying machines and entertainment robots. The molded product of the present embodiment may be used as a casing for these electrical products. The molded products of the present embodiment may be used not only for a casing of an electrical product but also as a component part or structural element of an electrical product. When a molded product, obtained on molding a resin composition of the present embodiment, is used as a component element of an electrical product, the electrical product exhibits sufficient flame retardant properties and preservation characteristics. Moreover, since the resin composition of the present embodiment exhibits biodegradability, it is possible to diminish adverse effects on environment at the time of and after disposal as compared to the synthetic resin.

The use of the molded product, obtained on molding the resin composition of the present embodiment, and exhibiting biodegradability, is not limited to those shown above, and may safely be extended to almost all uses, such as a packaging material, a component part for cars, or other industrial products, to say nothing of disposable products, centered about necessaries of life, hygiene products or playthings.

In the following, certain Examples of the resin products according to the present invention will be described in detail.

<Experiment 1>

Initially, the case of a biodegradable organic high molecular weight compound, employing an aliphatic polyester resin, will be described.

(Preparation of Samples)

As biodegradable aliphatic polyester resins, (A1) RATIA belonging to polylactic acid (H100J manufactured by MITSUI KAGAKU-SHA), (A2) BIONOLLE belonging to polybutylene succinate (#1020 manufactured by SHOWA KOBUNSHI SHA), (B) hydrolysis suppressing agent (CARBODILITE HMV-8CA, manufactured by NISSHIN BOSEKI-SHA), (C) various flame retardant additives (C1: triphenyl phosphate, manufactured by AJINOMOTO FINETECHNO SHA), C2: condensed phosphate, manufactured by DAIHACHI KAGAKU KOGYO SHA; C3: phosphinates, manufactured by CLAIENT JAPAN SHA; C4: ammonium polyphosphate, manufactured by CLAIENT JAPAN SHA), were used. A melt kneading method was used for mixing A, B and C.

As for kneading conditions, a MINIMAX-MIXRUDER, manufactured by TOYO SEIKI SHA, was used as a kneader. With the nozzle temperature set to 170 to 175° C., the torque set to 4 to 6 kg and with the time of residence set to three seconds or less, an additive was added to the resin by kneading. The resin composite material, thus produced, was pulverized, and subjected to press working at 170° C. under a pressure of 300 kg/cm2, to form a plate 1.0 mm in thickness. The plate was cut to measurement test pieces each of a size of 12.7 mm×12.7 mm. The composition of the test pieces of Examples 1 to 7 and Comparative Examples 1 to 5 are shown in Table 1.

A combustion test and a preservation test were then carried out in the following manner on the test pieces of the Examples 1 to 7 and the Comparative Examples 1 to 5, prepared as described above. Then, evaluation on the flame retardant properties and preservation characteristics was then made of the test pieces.

(Combustion Test)

A perpendicular combustion test was carried out on the above test pieces in accordance with UL94 combustibility test V-0 to V-2. This method will now be explained.

Each sample was kept with its longitudinal axis on a plumb line and a site 6.4 mm from the upper end of each sample was held by a clamp of a ring stand. The foremost part of a burner was set 9.5 mm below the lower end of the sample and a horizontal layer of a dried absorbent cotton for surgical use was spread at a location 305 mm below the lower end of the sample. For providing the horizontal layer, a small piece of the cotton about 12.7 mm by 25.4 mm was torn off from the lump of the absorbent cotton, with the tip of a thumb finger and an index finger of an operator, and spread apart with the operator's fingers so that the piece of cotton is 50.8 mm square and has a spontaneous thickness of 6.4 mm.

The burner was placed at a position spaced apart from the sample and ignited. The burner, so ignited, was adjusted so that it will issue a blue flame 19 mm in height. Specifically, the amount of the gas supplied and an air port of the burner were adjusted so that initially a yellow blue flame was issued at 19 mm from the burner end, The air volume was then adjusted so that the foremost yellow flame disappeared. The height of the flame was again measured to make adjustment as necessary.

A test flame was applied to the center of the lower end of the test sample and kept there for ten seconds. The flame was then moved away from the sample at least 152 mm and the time during which the sample burned as it emitted a flame was recorded. When the flame of the sample extinguished, the test flame was immediately applied again to the lower end of the sample. In ten seconds, the flame was again moved away from the sample and the time duration of combustion with and without the flame was recorded. If it is difficult to distinguish between the presence of flame and absence of flame, the cotton for surgical use is contacted with the site at issue. If the cotton is ignited, the flame is present. If, when the flame is contacted with the site at issue, melted or ignited sample portions are dripped from the sample, it is possible to tilt the burner at an angle of 45° and furthermore to move the burner slightly away from the 12.7 mm side of the sample to avoid the material from dripping into a burner tube. In case the fused or ignited sample portion is dripped from the sample or continues to be burned during the test, it is necessary to hold the burner manually to maintain the interval of 9.5 mm between the lower end of the sample and the distal end of the burner tube as long as the flame is contacted with the sample. The dripping of the fused cotton must be negligible, and the flame must be contacted with the sample center.

The material for 94V-1 approval, that is, the material approved to be 94V-1 must conform to the following conditions:

(a) None of the samples should burn with flame for 30 seconds or longer after each flame application;

(b) A total of ten flame contacting operations must be carried out for five samples of each set. The total of the burning time with flame must not exceed 250 seconds.

(c) None of the samples should reach the supporting clamp.

(d) The absorbent cotton for surgical use, disposed 305 mm below, should not be ignited by cotton portions dripping from the cotton sample.

(e) None of the samples should continue to be burned in a flameless state for 60 seconds or longer after moving the flame apart a second time.

(Preservation Test)

The molded product, prepared using the resin composition of the present embodiment, is required to possess preservation characteristics to a certain extent, for use as a molded article in e.g. a casing of an electrical apparatus, even though the molded product is biodegradable. In this consideration, the preservation characteristics at elevated temperature and humidity were evaluated. For this evaluation, each sample was preserved for 100 hours, at a temperature of 80° C. and at a relative humidity of 80%, and the shape as well as the molecular weight of the sample after lapse of this time duration was measured. The same test pieces as those used in the above combustion test were used. The test pieces which were not problematical in shape and had a molecular weight upholding ratio from the pre-evaluation value of 80% or higher were evaluated o and those which failed to meet this requirement were evaluated x. The molecular weight was evaluated by the CPC (Gel Permeation Chromatography). The following Table 1 shows the results of the combustion and preservation tests of the Examples 1 to 7 and the Comparative Examples 1 to 5. Meanwhile, in the following table, [UL94-V1; o] denotes that the sample in question is the 94V-1 approved material, while [UL94-V1; x] denotes that the sample in question is not the 94V-1 approved material.

TABLE 1

|  | Polylactic acid (A1) (parts by weight) | Polybutylene succinate (A2) (parts by weight) | Hydrolysis suppressing agent (B) (parts by weight) | Triphenyl phosphate (C1) (parts by weight) |
|---|---|---|---|---|
| Ex. 1 | 100 | 40 | 10 | 60 |
| Ex. 2 | 100 | 40 | 10 | — |
| Ex. 3 | 100 | 40 | 10 | — |
| Ex. 4 | 100 | 40 | 10 | — |
| Ex. 5 | 100 | 40 | 10 | — |
| Ex. 6 | 100 | 40 | 10 | 10 |
| Ex. 7 | 100 | 40 | 10 | — |
| Comp. Ex. 1 | 100 | 40 | 10 | — |
| Comp. | 100 | 40 | — | 60 |

TABLE 1-continued

| | | | | |
|---|---|---|---|---|
| Ex. 2 | | | | |
| Comp. Ex. 3 | 100 | 40 | — | — |
| Comp. Ex. 4 | 100 | 40 | — | — |
| Comp. Ex. 5 | 100 | 40 | — | — |

| | Condensed phosphate (C2) (parts by weight) | Phosphinate (C3) (parts by weight) | Ammonium Polyphosphate (C4) (parts by weight) | UL94V-1 | Preservation characteristics |
|---|---|---|---|---|---|
| Ex. 1 | — | — | — | ○ | ○ |
| Ex. 2 | 60 | — | — | ○ | ○ |
| Ex. 3 | — | 30 | — | ○ | ○ |
| Ex. 4 | — | 60 | — | ○ | ○ |
| Ex. 5 | — | — | 60 | ○ | ○ |
| Ex. 6 | — | 50 | — | ○ | ○ |
| Ex. 7 | 10 | 50 | — | ○ | ○ |
| Comp. Ex. 1 | — | — | — | x | ○ |
| Comp. Ex. 2 | — | — | — | ○ | |
| Comp. Ex. 3 | 60 | — | — | ○ | |
| Comp. Ex. 4 | — | 60 | — | ○ | |
| Comp. Ex. 5 | — | — | 60 | ○ | |

It is seen from the above Table 1 that the Examples 1 to 7, containing the biodegradable aliphatic polyester (A1 and A2), the hydrolysis suppressing agent (B) and the flame retardant additive which is the phosphorus-containing compound (at least one of C1 to C4), exhibit high flame retardant properties to the extent that they satisfy the UL94V-1 prescriptions, while also exhibiting high preservation characteristics. The Comparative Example 1, not containing the phosphorus containing compounds, failed to meet the UL94V-1 prescriptions. On the other hand, the Comparative Examples 2 to 5, not containing the hydrolysis suppressing agent (B), were deteriorated in preservation characteristics when compared to the Examples. It is seen from the results of the experiment 1 that compatibility of the flame retardant properties and the preservation characteristics becomes possible by adding the phosphorus containing compounds and the hydrolysis suppressing agent to the biodegradable aliphatic polyester resin.

<Experiment 2>

Next, the case of employing polysaccharides as the biodegradable organic high molecular weight compound will be scrutinized.

(Preparation of Samples)

In the experiment 2, (A3) acetyl cellulose (360E-16, manufactured by DICEL FINECHEM Co. Ltd.), as polysaccharide, and (A4) esterified starch (CPR-3M, manufactured by NIPPON CORN STARCH-SHA), were used in lieu of the biodegradable polyester resin. As for (B) hydrolysis suppressing agent and (C) a variety of flame retardant additives, these are the same as those used in the experiment 1.

These feedstock materials were kneaded as in the experiment 1 to prepare measurement test pieces of Examples 8 to 21 and Comparative Examples 6 to 13. The following table 2 shows the compositions of the test pieces of the Examples 8 to 21 and the Comparative Examples 6 to 13.

As for the test pieces of these Examples 8 to 21 and the Comparative Examples 6 to 13, combustion and preservation tests were conducted in the same way as in the experiment 1. The results of the combustion and preservation tests are shown in the following Table 2.

TABLE 2

| | Acetyl cellulose (A3) (parts by weight) | Esterified starch (A4) (parts by weight) | Hydrolysis suppressing agent (B) (parts by weight) | Triphenyl Phosphate (C1) (parts by weight) |
|---|---|---|---|---|
| Ex. 8 | 100 | — | 10 | 50 |
| Ex. 9 | 100 | — | 10 | — |
| Ex. 10 | 100 | — | 10 | — |
| Ex. 11 | 100 | — | 10 | — |
| Ex. 12 | 100 | — | 10 | — |
| Ex. 13 | 100 | — | 10 | 10 |
| Ex. 14 | 100 | — | 10 | — |
| Ex. 15 | — | 100 | 10 | 50 |
| Ex. 16 | — | 100 | 10 | — |
| Ex. 17 | — | 100 | 10 | — |
| Ex. 18 | — | 100 | 10 | — |
| Ex. 19 | — | 100 | 10 | — |

TABLE 2-continued

| | | | | |
|---|---|---|---|---|
| Ex. 20 | — | 100 | 10 | 10 |
| Ex. 21 | — | 100 | 10 | — |
| Comp. Ex. 6 | 100 | — | — | 50 |
| Comp. Ex. 7 | 100 | — | — | — |
| Comp. Ex. 8 | 100 | — | — | — |
| Comp. Ex. 9 | 100 | — | 10 | — |
| Comp. Ex. 10 | — | 100 | — | 50 |
| Comp. Ex. 11 | — | 100 | — | — |
| Comp. Ex. 12 | — | 100 | — | — |
| Comp. Ex. 13 | — | 100 | 10 | — |

| | Condensed phosphate (C2) (parts by weight) | Phosphinate (C3) (parts by weight) | Ammonium Polyphosphate (C4) (parts by weight) | UL94V-1 | Preservation characteristics |
|---|---|---|---|---|---|
| Ex. 8 | — | — | — | ○ | ○ |
| Ex. 9 | 50 | — | — | ○ | ○ |
| Ex. 10 | — | 30 | — | ○ | ○ |
| Ex. 11 | — | 50 | — | ○ | ○ |
| Ex. 12 | — | — | 50 | ○ | ○ |
| Ex. 13 | — | 40 | — | ○ | ○ |
| Ex. 14 | 10 | 40 | — | ○ | ○ |
| Ex. 15 | — | — | — | ○ | ○ |
| Ex. 16 | 50 | — | — | ○ | ○ |
| Ex. 17 | — | 30 | — | ○ | ○ |
| Ex. 18 | — | 50 | — | ○ | ○ |
| Ex. 19 | — | — | 50 | ○ | ○ |
| Ex. 20 | — | 40 | — | ○ | ○ |
| Ex. 21 | 10 | 40 | — | ○ | ○ |
| Comp. Ex. 6 | — | — | — | ○ | x |
| Comp. Ex. 7 | — | 50 | — | ○ | x |
| Comp. Ex. 8 | — | — | 50 | ○ | x |
| Comp. Ex. 9 | — | — | — | x | ○ |
| Comp. Ex. 10 | — | — | — | ○ | x |
| Comp. Ex. 11 | — | 50 | — | ○ | x |
| Comp. Ex. 12 | — | — | 50 | ○ | x |
| Comp. Ex. 13 | — | — | — | x | ○ |

It is seen from the above Table 2 that the Examples 8 to 14, containing the acetyl cellulose (A3), as biodegradable polysaccharide, the hydrolysis suppressing agent (B) and the flame retardant additive which is the phosphorus-containing compound (at least one of C1 to C4), exhibited high flame retardant properties to the extent that they satisfy the UL94V-1 prescriptions, while also exhibiting high preservation characteristics. The Comparative Example 9, not containing the phosphorus containing compounds, failed to meet the UL94V-1 prescriptions. On the other hand, the Comparative Examples 6 to 8, not containing the (B) hydrolysis suppressing agent, were deteriorated in preservation characteristics when compared to the Examples 8 to 14.

In case of employing the esterified starch (A4), as biodegradable polysaccharide, high flame retardant properties to the extent of satisfying the UL94V-1 prescriptions may be attained in case all of the esterified starch (A4), the hydrolysis suppressing agent (B) and the flame retardant additive, which is the phosphorus-containing compound (at least one of C1 to C4), are contained (Examples 15 to 21), as in the case of employing acetyl cellulose (A3). Moreover, in this case, the preservation characteristics are also high. Conversely, the Comparative Example 13, not containing the phosphorus-containing compound, failed to satisfy the UL94V-1 prescriptions, while the Comparative Examples 10 and 12, not containing the hydrolysis suppressing agent (B), were deteriorated in preservation characteristics as compared to the Examples 15 to 21.

It is seen from the results of the experiment 2 that compatibility of the flame retardant properties and the preservation characteristics becomes possible by adding the phosphorus containing compounds and the hydrolysis suppressing agent to the biodegradable polysaccharide.

As the resin composition according to the present invention, a resin composition, containing a biodegradable organic high molecular weight compound, a phosphorus-containing compound and a hydroxide, operating as flame retardant additives, and a hydrolysis suppressing agent, adjusting the rate of hydrolysis of the biodegradable organic high molecular weight compound, will now be described.

The biodegradable organic high molecular weight compound, constituting this resin composition, may be the same as that already described, and hence the description is dispensed with.

In the present embodiment, the hydroxide and the phosphorus-containing compound are admixed to the resin composition as the flame retardant additives. The flame retardant additives may be added to a system mainly composed of the high molecular material, such as resin by mixing or fixing. By addition of the flame retardant additive at this time, the flame retardant additive acts as flame retarder-stabilizer-extender, thus conferring flame retardant performance, stability and extensibility to the biodegradable organic high molecular weight compound to be added by the present additive.

When a hydroxide is contained as the flame retardant additive in the biodegradable resin, and the biodegradable organic high molecular weight compound is subjected to an elevated temperature, such as a temperature of approximately 500° C., the hydroxide yields water, at the same time as it absorbs heat generated on combustion of the resin and is decomposed. Thus, flame retardant properties are demonstrated by the endothermic action and water generation.

As the hydroxide, a component of the flame retardant additive, such a compound containing a hydroxyl group in its molecule, and capable of yielding water on heating, may be used. Specifically, the hydroxides are metal hydroxides containing metal elements in the composition. Concrete examples of the hydroxides include those mainly composed of at least one of aluminum hydroxide, magnesium hydroxide, calcium hydroxide, zinc hydroxide, cerium hydroxide, iron hydroxide, copper hydroxide, titanium hydroxide, barium hydroxide, beryllium hydroxide, manganese hydroxide, strontium hydroxide, zirconium hydroxide, gallium hydroxide, calcium aluminate hydrates ($3CaO.Al_2O_3.6H_2O$) and hydrotalcite ($Mg_6Al_2(OH)_{16}CO_3.4H_2O$). Of these, aluminum hydroxide, magnesium hydroxide and calcium hydroxide are preferred.

Those hydroxides having purity not lower than approximately 99.5% are more desirable. It is because the higher the purity of the hydroxides, the higher becomes preservation stability for a case where the hydroxides are combined with the hydrolysis suppressing agent. The purity of the hydroxide may be measured using a known method. For example, the content of impurities, contained in the hydroxides, may be measured by a known method and the content of the impurities may then be subtracted from the entire weight to give the purity of the hydroxide. More specifically, with aluminum hydroxide, the impurities may be enumerated by $Fe_2O_3$, $SiO_2$, T—$Na_2O$ and S—$Na_2O$. The content of $Fe_2O_3$ may be found by o-phenanthro phosphorus absorptiometry (JIS H 1901) following melting in a sodium carbonate-boric acid solution. The content of $SiO_2$ may be found by molybdenum blue absorptiometry (JIS H 1901) following melting in a sodium carbonate-boric acid solution. The content of T—$Na_2O$ may be found by frame photometry following melting in sodium carbonate-boric acid solution. The content of T—$Na_2O$ may be found by flame photometry following extraction with warm water. The content, found as described above, may then be subtracted from the weight of aluminum hydroxide to give the purity of the hydroxide. If the purity is 99.5% or higher, plural different flame retardant hydroxides may, of course, be used in combination.

Although there is no limitation to the shape of the hydroxide, used in the present embodiment, it is preferably particulate. The average particle size of the hydroxide may suitably be selected depending on the sort of the flame retardant hydroxide. The average particle size, as found by the laser diffraction method, is desirably not larger than approximately 100 μm. There is no limitation to the particle size distribution. From the perspective of injection molding performance for the molding process and dispersibility for kneading, the above range is desirable as the average particle size. A smaller value in the above range is preferred. It is of course possible to use plural sorts of the flame retardant hydroxides for raising the filling factor to the composition.

In addition, the hydroxide is preferably a particle having a BET specific surface area as found by the nitrogen gas adsorption method not larger than approximately 20 m2/g. It is of course possible to use plural sorts of the compounds having different values of the BET specific surface area for raising the filling factor to the composition. From the perspective of moldability, the BET specific surface area is desirably in the above range, and a smaller value in the above range is more preferred.

In the present embodiment, a phosphorus-containing compound, containing a phosphorus atom in a molecule, is used, in addition to the above hydroxide, as the flame retardant additive. The phosphorus-containing compound may be mixed (added), by mixing or fixing, to a target system of addition, formed essentially of a high molecular material, such as resin. The above additive, added by the phosphorus-containing compound, operates as the flame retarder, stabilizer and as extender, for conferring flame retardant properties, stability and volume increasing properties to the biodegradable organic high molecular weight compound which is the target system of addition. Specifically, when the target system of addition is subjected to an elevated temperature, for example, a temperature of 500° C. or higher, the dehydrating action and the heat shielding action, incurred by charring, act synergistically to confer high flame retardant properties to the target system of addition.

When the phosphorus-containing compound is used in combination with the biodegradable high molecular weight compound, a higher flame retardant performance may be achieved than when the phosphorus-containing compound is combined with other resins. The reason is presumably that the temperature of decomposition of the biodegradable high molecular weight compound is close to the temperature at which the phosphorus-containing compound acts as the flame retarder and hence the biodegradable high molecular weight compound may readily be mixed with the phosphorus-containing compound.

There is an additional merit that, since the phosphorus-containing compound contains phosphor, as a constituent of the living organism, the effect on the ecological system is lesser than that imparted by the pre-existing flame retardant hydroxide.

As the phosphorus-containing compound, organic phosphorus compounds, the element phosphorus or inorganic phosphorus compounds may be used. The organic phosphorus compounds may be enumerated by monomeric organic phosphorus compounds and polymeric organic phosphorus compounds. The monomeric organic phosphorus compounds may be enumerated by organic phosphonates, organic phosphinates, organic phosphates, phosphoric esters, phosphorous esters, phosphine oxide, hypophosphorous esters that may be substituted by alkyl group and/or aryl group, such as 9,10-dihydro-9-oxa-10-phosphor phenanthrene-10-oxide, phosphono carboxylates, nitrogen-containing phosphoric esters, ammonium salts of acidic aliphatic phosphoric esters, and salts of amine-containing compounds. The aforementioned phosphoric esters may be enumerated by aliphatic phosphoric esters, aromatic phosphoric esters, such as triphenyl phosphate, and aliphatic-aromatic phosphoric esters. The phosphorous esters may be exemplified by aromatic phosphorous esters, aliphatic phosphorous esters and aliphatic-aromatic phosphorous esters.

The polymeric organic phosphorus compounds, out of the organic phosphorus compounds, may be exemplified by condensates of the monomeric organic phosphorus compounds, polymeric phosphoric esters containing hydroxyl groups, such as phenolic resins, polyphosphinic carboxylates, polyphospphonic acid amides and phosphasen compounds.

The condensates may be exemplified by for example resorcinol phosphates, hydrochinone phosphates, biphenol phosphates and bisphenol phosphates.

An example of the element phosphorus is red phosphorus. The inorganic phosphorus compound may be exemplified by polyphosphates, phosphates and surface-processed compounds of red phosphorus. The phosphates are derived from phosphoric acid exemplified by ortho phosphoric acid, phosphorous acid, polyphosphoric acid, polyphosphorous acid (metaphosphorous acid and pyrophosphorous acid). The salts of the phosphates may be enumerated by alkali metal salts, such as lithium salts, sodium salts or potassium salts, and alkali earth metal salts, such as aluminum salts, ammonium salts and amine salts.

Meanwhile, the organic phosphorus compounds, the element phosphorus and the inorganic phosphorus compounds include salts of the organic or inorganic phosphoric acid with metals or with amine-containing compounds. The organic or inorganic phosphoric acids may be substituted by alkyl and/or aryl groups. The phosphorus containing compounds may be any of the above compounds which may be used alone or in combination.

The amount of addition of the phosphorus containing compound is preferably such that the proportion of phosphorus atoms in the phosphorus containing compound accounts for not more than 20 parts by weight to 100 parts by weight of an ultimate composition composed of the resin, the phosphorus containing compound, flame retarder, hydrolysis suppressing agent and other additives. In case the amount of addition exceeds the upper limit, given above, desired physical properties of the resin cannot be achieved.

The flame retardant additive preferably contains the nitrogen compounds in addition to the aforementioned hydroxide and phosphorus-containing compound. As the nitrogen compound, as a component of the flame retardant additive, those generating combustion obstructive gases on heating may be used. When the target system of addition of the flame retardant additive is subjected to an elevated temperature, the nitrogen compound is decomposed to generate the combustion obstructive gases to improve the combustion retardant effect of the target system of addition. The improved flame retardant performance is presumably ascribable to the fact that the amount of oxygen needed for combustion in the vicinity of the target material is decreased as a result of generation of the combustion obstructive gases. Specified examples of the combustion obstructive gases include nitrogen-containing gases, such as a nitrogen gas generated by decomposition of the nitrogen compound, a nitrogen dioxide gas, a nitrogen monoxide gas or NO2 gas.

With the flame retardant additive containing both the hydroxide and the nitrogen-containing gas, the flame retardant performance proper to the hydroxide and the flame retardant effect achieved by the nitrogen-containing combustion obstructive gases, generated on decomposition of the nitrogen compound, act synergistically when the biodegradable organic high molecular weight compound is subjected to elevated temperatures, for example, a temperature not lower than 500° C. Specifically, when a molded product of the biodegradable resin composition of the present embodiment, containing the flame retardant additive, is heated, the nitrogen oxide based gas (NxOy based gas) generated by heating the nitrogen compound reacts with water generated on heating the hydroxide to yield nitric acid. By the thermal oxidation of nitric acid, generated by this reaction, the high molecular weight compound, such as biodegradable resin, is converted into non-combustible materials, such as CO2 or H2O, thus imparting high flame retardant properties. Hence, by using the hydroxide and the nitrogen compound together as the flame retardant additive, it is possible to impart higher flame retardant properties to the biodegradable organic high molecular weight compound than in case the hydroxide is used by itself.

The nitrogen compound, used as flame retardant additive, may, for example, be a compound containing at least a nitrogen oxide of the formula of NxOy, where x and y are natural numbers, in its composition. For example, a non-metallic nitric acid compound and/or a non-metallic nitrous acid compound may be used. Examples of the nitrogen compound include phosphoric esters (RONO2), such as acetyl nitrate (C2H3NO4), aniline nitrate (C6H8N2O3), ethyl nitrate (C2H5ONO2), butyl nitrate (C4H9ONO2), isoamyl nitrate (CH3)2CHCH2CH2ONO2), isobutyl nitrate (CH3)2CHCH2ONO2) or isopropyl nitrate (CH3)2CHONO2), ammonium nitrate (NH4NO3), guanidine nitrate (CH6N4O3), cellulose nitrate acetate (nitroacetyl cellulose), cellulose nitrate (nitrocellulose), urea nitrate, hydrodinium nitrate (N2H5NO3), hydroxylammonium nitrate ((NH3O) NO3), and benzene diazonium nitrate (C6H5N3O3), and nitrous esters (RONO), such as ammonium nitrite, ethyl nitrite, methyl nitrite, propyl nitrite, butyl nitrite, isobutyl nitrite and isoamyl nitrite. The aforementioned nitrogen compounds may be used either singly or in combination.

It is preferred for the average particle size of the nitrogen compound to be 100 µm or less. If 100 µm is exceeded, the filling factor or dispersibility may be deteriorated.

The flame retardant additive may be surface processed with silane-based, titanate based, aluminum-based, zircon aluminum-based, fatty acid based or wax-based surfactants. Examples of the surfactants include silane coupling agents, titanate-based coupling agents or aluminate-based coupling agents, fatty acid based surfactants, such as stearic acid, oleic acid, linolic acid, linoleic acid, linoleinic acid or eleostearic acid, fatty acid salts, such as calcium or zinc salts of the above fatty acids and nonionic surfactants, such as polyethylene glycol derivatives.

The amount of addition of the hydroxide and the nitrogen compounds is preferably 1 to 50 parts by weight of the nitrogen compound and 20 to 120 parts by weight of the hydroxide, to 100 parts by weight of the organic high molecular weight compound of interest. If the amount of the nitrogen compound is less than 1 part by weight, the aforementioned effect cannot be displayed sufficiently. If the amount exceeds 50 parts by weight, the mechanical strength, for example, of the organic high molecular weight compound, as the target system of addition, tends to be deteriorated. The amount of addition of the nitrogen compound is more preferably 1 to 20 parts by weight. If, on the other hand, the amount of addition of the hydroxide is less than 20 parts by weight, the aforementioned effect cannot be displayed sufficiently. If the amount of addition of the hydroxide exceeds 120 parts by weight, there may be a case where undesirably the strength, for example, of the high molecular weight compound as the system for addition cannot be maintained. An optimum amount of addition of the hydroxide is 30 to 100 parts by weight.

There is also no particular limitation to the amount of the hydrolysis suppressing agent used in the present embodiment, provided that the hydrolysis suppressing agent is an additive which suppresses hydrolysis of the biodegradable high molecular weight compound. With content of the hydrolysis suppressing agent, suppressing hydrolysis of the biodegradable high molecular weight compound, the rate of hydrolysis of the biodegradable high molecular weight compound is delayed, thus providing high preservation characteristics that high mechanical strength or impact strength may be maintained for an extended period of time.

Specified hydrolysis suppressing agents may be exemplified by compounds exhibiting reactivity with active hydrogen contained in the biodegradable high molecular weight compound, as those used in the aforementioned resin composition. By adding the above compound, it becomes possible to reduce the amount of active hydrogen in the biodegradable high molecular weight compound to prevent the biodegradable high molecular chain from being catalytically hydrolyzed by the active hydrogen. The active hydrogen herein means hydrogen in the bond of oxygen or nitrogen with hydrogen (N—H or O—H bond), this hydrogen being higher in reactivity than hydrogen in the carbon-hydrogen bond (C—H bond). More specifically, such active hydrogen is present in for example the carboxylic group —COOH, a hydroxy group —OH, an amino group —NH2 or in an amido linkage —NHCO— in the biodegradable high molecular weight compound.

The compound having reactivity to the active hydrogen in the biodegradable high molecular weight compound may be exemplified by a carbodiimide compound, an isocyanate compound and an oxazoline compound. In particular, the carbodiimide compound is desirable since the compound may be melted and kneaded with the biodegradable high molecular weight compound and it is sufficient to add only a small amount of the compound to suppress hydrolysis effectively.

Since the specified structures of the carbodiimide compounds, isocyanate compounds and the oxazolidine compounds are similar to those discussed above, reference is to be made to the above description and detailed description is dispensed with.

There is also no particular limitation to the sorts or the amounts of the hydrolysis suppressing agent. The rate of biodegradation and further the mechanical strength of the molded product may be adjusted by suitably adjusting the sorts or the amounts of the hydrolysis suppressing agent, and hence the sorts or the amounts of the hydrolysis suppressing agent may be determined depending on the targeted ultimate product. For example, the hydrolysis suppressing agent may be added in an amount not more than 20 parts by weight and preferably in an amount not more than 13 parts by weight to 100 parts by weight of the organic high molecular weight compound.

There is no limitation to the method for preparing the resin composition of the present embodiment, such that any suitable known method may be used. Such a method consisting in melting the flame retardant additive and the hydrolysis suppressing agent and mixing the resulting product to the biodegradable organic high molecular weight compound may be recited as a preferred method for preparing the resin composition.

The method by melting and kneading is carried out by adding the flame retardant additive and the hydrolysis suppressing agent, before or when melting the biodegradable organic high molecular weight compound, and by mixing the resulting mass. The flame retardant additive and the hydrolysis suppressing agent may be added simultaneously or separately. If the flame retarder and the hydrolysis suppressing agent are added separately, any one of them may be added initially. In an alternative method, the biodegradable organic high molecular weight compound is melted and thereafter the flame retarder or the hydrolysis suppressing agent is added and mixed. The resulting composition is re-melted together and the remaining one of the hydrolysis suppressing agent and the flame retarder is added and mixed. The hydroxide, phosphor-containing compound and the nitrogen compound, as the flame retardant additive, may be added simultaneously or separately. The flame retardant additive used may also be compounded of constituent components.

Other suitable additives may be used in the resin composition of the present embodiment, for improving its performance, as long as such addition is not contrary to the object of the present invention. These other additives include, in addition to reinforcements, anti-oxidants, thermal stabilizers and UV ray absorbers, lubricants, waxes, coloring matter, crystallization accelerators, anti-dripping agents and degradable organic substances, such as starch, only by way of examples. These additives may be used either alone or in combination.

The reinforcements, added to the resin composition, may be enumerated by, for example, fillers, such as inorganic and organic fillers. Since the fillers described above may be used directly for the present fillers, reference is made to the previous description and the detailed description is dispensed with.

As for the anti-oxidants, phenol-, amine-, phosphorus-, sulfur-, hydroquinone- or quinoline-based anti-oxidants may be used, as in the previous embodiment. Since the specified examples of these anti-oxidants are as discussed above, reference is made to the previous description and detailed explanation is dispensed with.

As for thermal stabilizers and UV ray absorbers, as additives, used in the resin composition of the present embodiment, those given above may directly be used. Hence, reference is made to the previous description and detailed explanation is dispensed with.

As for the degradable organic materials, usable as additive, such as lubricants, coloring matter, crystallization accelerators, anti-dripping agents or starch, those indicated above may directly be used. Hence, reference is made to the previous description and detailed explanation is dispensed with.

The resin composition of the present embodiment may be processed in known manner. For example, the resin composition of the present embodiment may be irradiated with active energy rays for suppressing hydrolysis of the biodegradable high molecular weight compound of the present embodiment.

As a source of active energy rays, electromagnetic waves, an electron beam or corpuscular radiation, may be used, either alone or in combination. The electromagnetic waves may be enumerated by ultraviolet (UV) radiation and X-rays, while the corpuscular radiation may be enumerated by radiation of corpuscles, such as protons and neutrons. In particular, electron beam irradiation with the use of an electron accelerator is desirable.

The active energy rays may be illuminated using known devices. Examples of the known devices include UV illuminating devices and electron accelerators. There is no limitation to the radiation dose and the radiation intensity provided that radiation dose and radiation intensity are of such values as to effectively delay the hydrolysis of the biodegradable high molecular weight compound. For example, in the case of the electron beam, the acceleration voltage of the order of 100 to 5000 kV and the radiation dose of the order of 1 kGy or higher are preferred.

The molded product, obtained on molding the resin composition of the present embodiment, may be put to a variety of uses. The molding method, used for preparing molded products, may be enumerated by pressure forming, film forming, extrusion or injection molding. Of these, the injection molding is most desirable. Specifically, the injection molding is carried out as conventionally, using a uniaxial extruder, a multi-axial extruder or a tandem extruder. The injection molding may also be carried out as conventionally, using known injection molding machines, such as an in-line screw injection extruder, a multi-layer injection molding machine or a double-head injection molding machine. There is no particular limitation to the methods for preparing molded products by molding the resin composition, such that any of known molding methods may be used.

With the resin composition, containing the biodegradable organic high molecular weight compound, the hydroxide and the phosphorus-containing compounds, as flame retardant additives, and the hydrolysis suppressing agent, it is possible to achieve compatibility between extremely high flame retardant properties, satisfying the range of from V0 to V1, based evaluation made by e.g. a UV combustibility test, and excellent preservation characteristics, which will sufficiently assure the use of the resin composition as a feedstock for a casing for an electrical product.

The molded product, formed by the resin composition of the present embodiment, is composed mainly of the biodegradable resin, as safe component for the living organism, and is decomposed with relative ease in nature. Hence, it is possible to diminish adverse effects on the environment at the time of or after disposal. Moreover, the flame retardant additive, used in the present embodiment, exhibits high flame retardant performance, while being decomposed, after disposal, into components safe for a living organism or global environment, such as alumina, water or carbon dioxide, thus not adversely affecting the ambient environment or the human being. Consequently, with the use of the molded product for a casing of an electrical product or a packaging material, sufficient consideration may be given to environment as compared to the case of using the pre-existing synthetic resin material or biodegradable resin.

Similarly to the aforementioned product, employing the resin composition, the molded product, obtained on molding the resin composition of the present embodiment, may be applied with advantage to a part of an electrical product for which it has been thought to be difficult to use the biodegradable resin. Concrete examples of the electrical products are the same as those described above and hence the detailed description is dispensed with.

The use of the molded product, obtained on molding the resin composition of the present embodiment, and exhibiting biodegradability, is not limited to those shown above, and may safely be extended to almost all uses, such as a packaging material, a component part for cars, or other industrial products, to say nothing of disposable products, centered about necessaries of life, hygiene products or playthings.

In the following, certain Examples of the resin products according to the present invention will be described in detail.

<Experiment 3>

In an experiment 3, the case of using an aliphatic polyester resin, as a biodegradable organic high molecular weight compound, is scrutinized.

(Preparation of Samples)

As biodegradable aliphatic polyester, (A1) RATIA belonging to polylactic acid (H100J manufactured by MITSUI KAGAKU-SHA), (A2) BIONOLLE belonging to polybutylene succinate (#1020 manufactured by SHOWA KOBUNSHI SHA), (B) hydrolysis suppressing agent (CARBODILITE HMV-8CA, manufactured by NISSHIN BOSEKI-SHA), (C) various flame retardant additives (C1: aluminum hydroxide, manufactured by WAKO JUNYAKU-SHA), C2: ammonium nitrate, manufactured by DAIHACHI KAGAKU KOGYO SHA; C3: triphenyl phosphate, manufactured by AJINOMOTO FINETECHNO-SHA; C4: phosphinate, manufactured by CLAIENT JAPAN SHA), were used. A melt kneading method was used for mixing A, B and C.

As for kneading conditions, a MINIMAX-MIXRUDER, manufactured by TOYO SEIKI SHA was used as a kneader. With the nozzle temperature set to 170 to 175° C., the torque set to 4 to 6 kg and with the time of residence set to three seconds or less, an additive was added to the resin by kneading. The resin composite material, thus produced, was pulverized, and subjected to press working at 170° C. under a pressure of 300 kg/cm2, to form a plate 1.0 mm in thickness. The plate was cut to measurement test pieces each of a size of 12.7 mm×12.7 mm. The composition of the test pieces of Examples 22 to 42 and Comparative Examples 14 to 16 are shown in Table 1.

A combustion test and a preservation test were then carried out in the following manner on the test pieces of the Examples 1 to 21 and the Comparative Examples 1 to 3, prepared as described above. Then, evaluation on the flame retardant properties and preservation characteristics was made of the test pieces.

(Combustion Test)

A perpendicular combustion test was carried out on the above test pieces in accordance with UL94 combustibility test V-0 to V-2. This method will now be explained.

Each sample was kept with its longitudinal axis on a plumb line, and a site 6.4 mm from its upper end of each sample was held by a clamp of a ring stand. The foremost part of a burner was set 9.5 mm below the lower end of the sample and a horizontal layer of dried absorbent cotton for surgical use was spread 305 mm below the lower end of the sample. For providing the horizontal layer, a small piece of the cotton about 12.7 mm by 25.4 mm was torn off from the lump of the absorbent cotton, with the tip of a thumb finger and an index finger of an operator, and spread apart with the operator's fingers, so that the piece of cotton is 50.8 mm square and has a spontaneous thickness of 6.4 mm.

The burner was placed at a position spaced apart from the sample and ignited. The burner, so ignited, was adjusted so that it will issue a blue flame 19 mm in height. Specifically, the amount of the gas supplied and an air port of the burner were adjusted so that initially a yellow blue flame will be issued at 19 mm from the burner end, The air volume was then adjusted so that the foremost yellow flame disappeared. The height of the flame was again measured to make adjustment as necessary.

A test flame was applied to the center of the lower end of the test sample and kept there for ten seconds. The flame was then moved away from the sample at least 152 mm and the time during which the sample burned as it emitted a flame was recorded. When the flame of the sample was extinguished, the test flame was immediately applied again to the lower end of the sample. In ten seconds, the flame was again moved away from the sample and the time durations of combustion with and without the flame were recorded. If it is difficult to distinguish between the presence of flame and absence of flame, the cotton for surgical use is contacted with the site at issue. If the cotton is ignited, the flame is present. If, when the flame is contacted with the site at issue, melted or ignited sample portions are dripped from the sample, it is possible to tilt the burner at an angle of 45° during the time the flame is contacted with the sample, and furthermore to move the burner slightly away from the side of 12.7 mm of the sample to avoid the material from dripping into a burner tube. In case the fused or ignited sample portion is dripped from the sample or continues to be burned during the test, it is necessary to hold the burner manually to maintain the interval of 9.5 mm between the lower end of the sample and the distal end of the burner tube as long as the flame is contacted with the sample. The dripping of the fused cotton must be negligible, and the flame must be contacted with the sample center.

The material for 94V-1 approval, that is, the material approved to satisfy 94V-1, must conform to the following conditions:

(a) None of the samples should burn with the flame for 30 seconds or longer after each flame application;

(b) A total of ten flame contacting operations must be carried out for five samples of each set. The total of the burning time with flame must not exceed 250 seconds.

(c) None of the samples should reach the supporting clamp.

(d) The absorbent cotton for surgical use, disposed 305 mm below, should not be ignited by cotton portions dripping from the cotton sample.

(e) None of the samples should continue to be burned in a flameless state for 60 seconds or longer after moving the flame apart a second time.

(Preservation Test)

The molded product, prepared using the resin composition of the present embodiment, is required to possess preservation characteristics to a certain extent, for use as a molded article in e.g. a casing of an electrical apparatus, even though the molded product is biodegradable. In this consideration, the preservation characteristics at elevated temperature and humidity were evaluated. For this evaluation, each sample was preserved for 100 hours, at a temperature of 80° C. and at a relative humidity of 80%, and the shape as well as the molecular weight of the sample after lapse of this time duration was measured. The same test pieces as those used in the above combustion test were used. The test pieces which were not problematical in shape and had a molecular weight upholding ratio from the pre-evaluation value of 80% or higher were evaluated o and those which failed to meet this requirement were evaluated x. The molecular weight was evaluated by the CPC (Gel Permeation Chromatography). The following Table 3 shows the results of the combustion and preservation tests of the Examples 22 to 42 and the Comparative Examples 14 to 16. Meanwhile, in the following table, [UL94-V1; .smallcircle.] denotes that the sample in question is the 94V-1 approved material, while [UL94-V1; x] denotes that the sample in question is not the 94V-1 approved material.

TABLE 3

|  | Polylactic acid (A1) (parts by weight) | Polybutylene succinate (A2) (parts by weight) | Hydrolysis suppressing agent (B) (parts by weight) | Aluminum hydroxide (C1) (parts by weight) |
|---|---|---|---|---|
| Ex. 22 | 100 | 40 | 10 | 20 |
| Ex. 23 | 100 | 40 | 10 | 20 |
| Ex. 24 | 100 | 40 | 10 | 20 |
| Ex. 25 | 100 | 40 | 10 | 30 |
| Ex. 26 | 100 | 40 | 10 | 30 |
| Ex. 27 | 100 | 40 | 10 | 30 |
| Ex. 28 | 100 | 40 | 10 | 40 |
| Ex. 29 | 100 | 40 | 10 | 40 |
| Ex. 30 | 100 | 40 | 10 | 40 |
| Ex. 31 | 100 | 40 | 10 | 50 |
| Ex. 32 | 100 | 40 | 10 | 50 |
| Ex. 33 | 100 | 40 | 10 | 50 |
| Ex. 34 | 100 | 40 | 10 | 60 |
| Ex. 35 | 100 | 40 | 10 | 60 |
| Ex. 36 | 100 | 40 | 10 | 60 |
| Ex. 37 | 100 | 40 | 10 | 90 |
| Ex. 38 | 100 | 40 | 10 | 90 |
| Ex. 39 | 100 | 40 | 10 | 90 |
| Ex. 40 | 100 | 40 | 10 | 120 |
| Ex. 41 | 100 | 40 | 10 | 120 |
| Ex. 42 | 100 | 40 | 10 | 120 |
| Comp. Ex. 14 | 100 | 40 | — | 20 |
| Comp. Ex. 15 | 100 | 40 | — | 60 |
| Comp. Ex. 16 | 100 | 40 | 10 | — |

|  | Ammonium Nitrate (C2) (parts by weight) | Triphenyl phosphate (C3) (parts by weight) | Phosphinate (C4) (parts by weight) | UL94V-1 | Preservation characteristics |
|---|---|---|---|---|---|
| Ex. 22 | 20 | 60 | — | ○ | ○ |
| Ex. 23 | 20 | — | 60 | ○ | ○ |
| Ex. 24 | 20 | 30 | 30 | ○ | ○ |
| Ex. 25 | 15 | 55 | — | ○ | ○ |
| Ex. 26 | 15 | — | 55 | ○ | ○ |
| Ex. 27 | 15 | 27.5 | 27.5 | ○ | ○ |
| Ex. 28 | 10 | 50 | — | ○ | ○ |

TABLE 3-continued

|  | | | | | |
|---|---|---|---|---|---|
| Ex. 29 | 10 | — | 50 | ○ | ○ |
| Ex. 30 | 10 | 25 | 25 | ○ | ○ |
| Ex. 31 | 5 | 45 | — | ○ | ○ |
| Ex. 32 | 5 | — | 45 | ○ | ○ |
| Ex. 33 | 5 | 22.5 | 22.5 | ○ | ○ |
| Ex. 34 | 1 | 40 | — | ○ | ○ |
| Ex. 35 | 1 | — | 40 | ○ | ○ |
| Ex. 36 | 1 | 20 | 20 | ○ | ○ |
| Ex. 37 | — | 20 | — | ○ | ○ |
| Ex. 38 | — | — | 20 | ○ | ○ |
| Ex. 39 | — | 10 | 10 | ○ | ○ |
| Ex. 40 | — | 10 | — | ○ | ○ |
| Ex. 41 | — | — | 10 | ○ | ○ |
| Ex. 42 | — | 5 | 5 | ○ | ○ |
| Comp. Ex. 14 | 20 | 60 | — | ○ | x |
| Comp. Ex. 15 | 1 | 20 | 20 | ○ | x |
| Comp. Ex. 16 | — | — | — | x | ○ |

It is seen from Table 3 that the Examples 22 to Example 42, containing biodegradable polyester (A1 and A2), hydrolysis suppressing agent (B) containing at least aluminum hydroxide (C1) and the phosphorus-containing compound C3 and/or C4, exhibited high flame retardant properties to the extent that the UL94V-1 prescriptions is met, and also showed satisfactory preservation characteristics. Conversely, the Comparative Example 16, not containing the flame retardant additive, failed to satisfy the UL94V-1 prescriptions. On the other hand, the Comparative Examples 14 and 15, containing the hydroxide and the phosphorus-containing compound as the flame retardant additives but not containing the hydrolysis suppressing agent, were good in flame retardant properties, but were deteriorated in preservation characteristics.

It is seen from the results shown in Table 3 that, by adding the hydroxide and the phosphorus-containing compound, as flame retardant additives, and the hydrolysis suppressing agent, to the biodegradable aliphatic polyester, it is possible to achieve compatibility between flame retardant performance and preservation characteristics. The Comparative Examples 14 and 15, containing the hydroxide and the phosphorus-containing material but not containing the hydrolysis suppressing agent, as flame retardant additives, were satisfactory in flame retardant properties, however, were deteriorated in preservation characteristics.

It is seen from the results of the above experiment 3 that, by mixing the hydroxide and the phosphorus-containing compound, as flame retardant agents, and the hydrolysis suppressing agent, to the biodegradable aliphatic polyester, flame retardant performance and the preservation characteristics may be achieved simultaneously.

<Experiment 4>

The case of using polysaccharides as the biodegradable high molecular weight compound will now be scrutinized.

<Preparation of Samples>

In the experiment 4, acetyl cellulose (360E-16, manufactured by DICEL FINECHEM-SHA) (A3) and esterified starch (CPR-3M, manufactured by NIPPON CORN STARCH) were used as biodegradable polysaccharides. As the other components, the same components as those used in the experiment 3 were used.

These feedstock materials were kneaded in the same way as in the experiment 3 to prepare measurement test pieces of the Examples 43 to 84 and Comparative Examples 17 to 20. The compositions of the test pieces of the Examples 43 to 84 and Comparative Examples 17 to 20 are shown in the following Tables 4 and 5.

On the test pieces of these Examples 43 to 84 and Comparative Examples 17 to 20, combustion and preservation tests were carried out as in the experiment 3. The test results of the combustion and preservation tests are also shown in the following Tables 4 and 5.

TABLE 4

|  | Acetyl cellulose (A3) (parts by weight) | Esterified starch (A4) (parts by weight) | Hydrolysis suppressing agent (B) (parts by weight) | Aluminum hydroxide (C1) (parts by weight) |
|---|---|---|---|---|
| Ex. 64 | — | 100 | 10 | 10 |
| Ex. 65 | — | 100 | 10 | 10 |
| Ex. 66 | — | 100 | 10 | 10 |
| Ex. 67 | — | 100 | 10 | 20 |
| Ex. 68 | — | 100 | 10 | 20 |
| Ex. 69 | — | 100 | 10 | 20 |
| Ex. 70 | — | 100 | 10 | 30 |
| Ex. 71 | — | 100 | 10 | 30 |
| Ex. 72 | — | 100 | 10 | 30 |
| Ex. 73 | — | 100 | 10 | 40 |
| Ex. 74 | — | 100 | 10 | 40 |
| Ex. 75 | — | 100 | 10 | 40 |
| Ex. 76 | — | 100 | 10 | 50 |
| Ex. 77 | — | 100 | 10 | 50 |

TABLE 4-continued

|  |  |  |  |  |
|---|---|---|---|---|
| Ex. 78 | — | 100 | 10 | 50 |
| Ex. 79 | — | 100 | 10 | 80 |
| Ex. 80 | — | 100 | 10 | 80 |
| Ex. 81 | — | 100 | 10 | 80 |
| Ex. 82 | — | 100 | 10 | 110 |
| Ex. 83 | — | 100 | 10 | 110 |
| Ex. 84 | — | 100 | 10 | 110 |
| Comp. Ex. 17 | 100 | — | — | 10 |
| Comp. Ex. 18 | — | 100 | — | 10 |
| Comp. Ex. 19 | 100 | — | 10 | — |
| Comp. Ex. 20 | — | 100 | 10 | — |

|  | Ammonium nitrate (C2) (parts by weight) | Triphenyl phosphate (C3) (parts by weight) | Phosphinate (C4) (parts by weight) | UL94V-1 | Preservation characteristics |
|---|---|---|---|---|---|
| Ex. 64 | 10 | 50 | — | ○ | ○ |
| Ex. 65 | 10 | — | 50 | ○ | ○ |
| Ex. 66 | 20 | 25 | 25 | ○ | ○ |
| Ex. 67 | 50 | 45 | — | ○ | ○ |
| Ex. 68 | 5 | — | 45 | ○ | ○ |
| Ex. 69 | 5 | 22.5 | 22.5 | ○ | ○ |
| Ex. 70 | 5 | 40 | — | ○ | ○ |
| Ex. 71 | 3 | — | 40 | ○ | ○ |
| Ex. 72 | 3 | 25 | 20 | ○ | ○ |
| Ex. 73 | 3 | 35 | — | ○ | ○ |
| Ex. 74 | 2 | — | 35 | ○ | ○ |
| Ex. 75 | 2 | 17.5 | 17.5 | ○ | ○ |
| Ex. 76 | 2 | 30 | — | ○ | ○ |
| Ex. 77 | 1 | — | 30 | ○ | ○ |
| Ex. 78 | 1 | 15 | 15 | ○ | ○ |
| Ex. 79 | 1 | 10 | — | ○ | ○ |
| Ex. 80 | — | — | 10 | ○ | ○ |
| Ex. 81 | — | 5 | 5 | ○ | ○ |
| Ex. 82 | — | 3 | — | ○ | ○ |
| Ex. 83 | — | — | 3 | ○ | ○ |
| Ex. 84 | — | 2 | 2 | ○ | ○ |
| Comp. Ex. 17 | 10 | 50 | — | ○ | x |
| Comp. Ex. 18 | 10 | 50 | — | ○ | x |
| Comp. Ex. 19 | — | — | — | x | ○ |
| Comp. Ex. 20 | — | — | — | x | ○ |

TABLE 5

|  | Polylactic acid (A1) (parts by weight) | Polybutylene succinate (A2) (parts by weight) | Hydrolysis suppressing agent (B) (parts by weight) | Aluminum hydroxide (C1) (parts by weight) |
|---|---|---|---|---|
| Ex. 22 | 100 | 40 | 10 | 20 |
| Ex. 23 | 100 | 40 | 10 | 20 |
| Ex. 24 | 100 | 40 | 10 | 20 |
| Ex. 25 | 100 | 40 | 10 | 30 |
| Ex. 26 | 100 | 40 | 10 | 30 |
| Ex. 27 | 100 | 40 | 10 | 30 |
| Ex. 28 | 100 | 40 | 10 | 40 |
| Ex. 29 | 100 | 40 | 10 | 40 |
| Ex. 30 | 100 | 40 | 10 | 40 |
| Ex. 31 | 100 | 40 | 10 | 50 |
| Ex. 32 | 100 | 40 | 10 | 50 |
| Ex. 33 | 100 | 40 | 10 | 50 |
| Ex. 34 | 100 | 40 | 10 | 60 |
| Ex. 35 | 100 | 40 | 10 | 60 |
| Ex. 36 | 100 | 40 | 10 | 60 |
| Ex. 37 | 100 | 40 | 10 | 90 |
| Ex. 38 | 100 | 40 | 10 | 90 |
| Ex. 39 | 100 | 40 | 10 | 90 |
| Ex. 40 | 100 | 40 | 10 | 120 |
| Ex. 41 | 100 | 40 | 10 | 120 |

TABLE 5-continued

| | | | | |
|---|---|---|---|---|
| Ex. 42 | 100 | 40 | 10 | 120 |
| Comp. Ex. 14 | 100 | 40 | — | 20 |
| Comp. Ex. 15 | 100 | 40 | — | 60 |
| Comp. Ex. 16 | 100 | 40 | 10 | — |

| | Ammonium nitrate (C2) (parts by weight) | Triphenyl phosphate (C3) (parts by weight) | Phosphinate (C4) (parts by weight) | UL94V-1 | Preservation characteristics |
|---|---|---|---|---|---|
| Ex. 22 | 20 | 60 | — | ○ | ○ |
| Ex. 23 | 20 | — | 60 | ○ | ○ |
| Ex. 24 | 20 | 30 | 30 | ○ | ○ |
| Ex. 25 | 15 | 55 | — | ○ | ○ |
| Ex. 26 | 15 | — | 55 | ○ | ○ |
| Ex. 27 | 15 | 27.5 | 27.5 | ○ | ○ |
| Ex. 28 | 10 | 50 | — | ○ | ○ |
| Ex. 29 | 10 | — | 50 | ○ | ○ |
| Ex. 30 | 10 | 25 | 25 | ○ | ○ |
| Ex. 31 | 5 | 45 | — | ○ | ○ |
| Ex. 32 | 5 | — | 45 | ○ | ○ |
| Ex. 33 | 5 | 22.5 | 22.5 | ○ | ○ |
| Ex. 34 | 1 | 40 | — | ○ | ○ |
| Ex. 35 | 1 | — | 40 | ○ | ○ |
| Ex. 36 | 1 | 20 | 20 | ○ | ○ |
| Ex. 37 | — | 20 | — | ○ | ○ |
| Ex. 38 | — | — | 20 | ○ | ○ |
| Ex. 39 | — | 10 | 10 | ○ | ○ |
| Ex. 40 | — | 10 | — | ○ | ○ |
| Ex. 41 | — | — | 10 | ○ | ○ |
| Ex. 42 | — | 5 | 5 | ○ | ○ |
| Comp. Ex. 14 | 20 | 60 | — | ○ | x |
| Comp. Ex. 15 | 1 | 20 | 20 | ○ | x |
| Comp. Ex. 16 | — | — | — | x | ○ |

It is seen from these Tables 4 and 5 that the Examples 43 to 84, containing the biodegradable polysaccharides (A3 or A4), hydrolysis suppressing agent (B) and at least aluminum hydroxide (C1) and the phosphorus-containing compound (C3 and/or C4) of the flame retardant additives, exhibited high flame retardant performance to the extent that it satisfies UL94V-1 prescriptions, while also exhibiting high preservation characteristics. Conversely, the Comparative Examples 19 and 20 failed to satisfy the UL94V-1 prescriptions. The Comparative Examples 17 and 18, containing flame retardant additive but not containing the hydrolysis suppressing agent, exhibited high flame retardant performance, however, were defective in the preservation characteristics.

It is seen from the results of the above experiment that, by mixing the hydroxide and the phosphorus-containing compound, as the flame retardant additives, and the hydroxide, it is possible to achieve compatibility between the flame retardant properties and the preservation characteristics.

Next, a resin composition, containing a biodegradable organic high molecular weight compound, a phosphorus containing compound and a hydroxide, as flame retardant additives, and a hydrolysis suppressing agent, adjusting the rate of hydrolysis of the high molecular weight compound, will be described as a resin composition of the present invention.

As the biodegradable organic high molecular weight compound, making up the resin composition, biodegradable resins are preferred, as in the previous embodiment. These biodegradable resins may be enumerated by any one of biodegradable polyester resins, polysaccharides, peptides, polyvinyl alcohols, polyamides or polyalkylene glycols, or at least one of the aforementioned compounds. Although the biodegradable organic high molecular weight compound may be used alone, they may also be used in combination for deriving the merits proper to the respective compounds.

In the resin composition of the present embodiment, the biodegradable aliphatic polyester resins, having high mixing performance and volume producibility, belonging to the biodegradable organic high molecular weight compounds, may preferably be used. As the aliphatic polyester resins, polylactic acids, such as poly-L-lactic acid (PLLA) or a random copolymer of L-lactic acid and D-lactic acid, or derivatives thereof, are more preferred. Other compounds classified under aliphatic polyester, such as polycaprolactone, polyhydroxy lactic acid, polyhydroxy valeric acid, polyethylene succinate, polybutylene succinate, polybutylene adipate, polymalic acid, polyglycolic acid, polysuccinate, polyoxalate, butylenes polydiglicolate, polydioxanone, polyester synthesized by fermentation, and a copolymer containing at least one of these, may also be used. As aliphatic polyester resins, the above compounds may be used, either singly or in combination. The polyesters synthesized by fermentation may be enumerated by 3-hydroxybutyrate (3HB), 3-hydroxyvalerate (3HV) and copolymers thereof. As the aliphatic polyester resins, the above compounds may be used either single or in combination.

The peptides may be enumerated by collagen, casein, fibrin and gelatin, only by way of examples.

Among the polyamides, there are, for example, nylon4 and nylon2/nylon6 copolymers.

The organic high molecular weight compound, which are biodegradable at a low molecular weight but which are low in biodegradability at a high molecular weight, may also be used in the present embodiment, provided that such compound may become biodegradable when graft copolymerized with the aforementioned biodegradable high molecular weight compound. Among the organic high molecular weight compounds, which are low in biodegradability at a high molecular weight, there are, for example, polyethylene, polyacrylic acid derivatives, polypropylene and polyurethane. There is no particular limitation to the molecular weight or the terminal group of these resins, provided that sufficient mechanical strength may be achieved.

The biodegradable organic high molecular weight compound, as used in the present embodiment, may also be prepared by known methods. For example, the biodegradable aliphatic polyester may be prepared by a lactide method, polycondensation of polyhydric alcohols and polybasic acids, or by intermolecular polycondensation of hydroxycarboxylic acid, containing a hydroxyl group and a carboxylic group, only by way of examples.

In the resin composition of the present embodiment, the flame retardant additive containing the nitrogen compound and the hydroxide (referred to below sometimes simply as flame retardant additive) are mixed into the resin composition.

Such a hydroxide, generating water on heating, may be used as the hydroxide which is among the flame retardant additives. When the target system of addition of the flame retardant additive is subjected to an elevated temperature, the hydroxide absorbs the heat and yields water at the same time as it is decomposed. That is, the hydroxide displays flame retardant properties based upon the endothermic action and generation of water.

Such a nitrogen compound, generating combustion obstructive gases on heating, may be used as the nitrogen compound which is the component of the flame retardant additive. When the target system of addition of the flame retardant additive is subjected to an elevated temperature, the nitrogen compound is decomposed and thereby generates combustion obstructive gases to improve the flame retardant effect of the flame retardant additive. The flame retardant properties are improved presumably because the amount of oxygen needed for combustion is relatively decreased in the vicinity of the target system of addition due to generation of the combustion obstructive gases. Specified examples of the combustion obstructive gases include a nitrogen gas generated on decomposition of nitrogen compounds, and nitrogen containing gases, such as nitrogen oxide based gases, e.g. a nitrogen dioxide gas, a nitrogen monoxide gas or $NO_2$ gas.

The flame retardant additives may be compounded (added) to the target system of addition, mainly composed of a high molecular material, such as resin, by mixing or fixing. The flame retardant additive, added to the resin composition, acts as a flame retarder, a stabilizer and as an extender, to confer flame retardant properties, stability and extensibility to the biodegradable organic high molecular weight compound, which is the target system of addition of the present invention. When the target system of addition is subjected to an elevated temperature, such as a temperature exceeding 500° C., as an example, the nitrogen oxide based gas ($N_xO_y$ based gas), generated by heating of the hydroxide, is reacted with water, generated by heating of the hydroxide. By the action of thermal oxidation of nitric acid, generated by this reaction, the high molecular weight compound, such as biodegradable resin, as the target system of addition, is modified into a non-combustible material, such as $CO_2$ or $H_2O$, thereby conferring high flame retardant properties. Thus, high flame retardant properties may be realized by using the hydroxide and the phosphorus compound, as the flame retardant additive, such that it becomes possible to confer high flame retardant performance, satisfying the range of V-0 to V-1, when evaluation is made by for example a UL94 combustibility test.

This flame retardant additive, exhibiting high flame retardant performance, is decomposed, after disposal, into components safe against living organisms or global environment, such as alumina, water or carbon dioxide, so that there is no fear of the flame retardant additive adversely affecting the environment or the human being.

As the hydroxide, which is a compound containing hydroxyl groups in its molecule, such compound which yields water on heating may be used. Concrete examples of hydroxides include metal hydroxides containing a metal element in the composition. As the hydroxide, such compounds essentially composed of at least one of aluminum hydroxide, magnesium hydroxide, calcium hydroxide, zinc hydroxide, cerium hydroxide, iron hydroxide, copper hydroxide, titanium hydroxide, barium hydroxide, beryllium hydroxide, manganese hydroxide, strontium hydroxide, zirconium hydroxide, gallium hydroxide and calcium aluminate hydrates ($3CaO.Al_2O_3.6H_2O$), hydrotalcite ($MgAl_2(OH)_{16}CO_3.4H_2O$). Of these, aluminum hydroxide, magnesium hydroxide and calcium hydroxide are preferred.

The hydroxides with a purity exceeding approximately 99.5% are more preferred, because the higher the purity of the hydroxide, the higher may be the preservation stability when the hydroxide is used in combination with the hydrolysis suppressing agent. The purity of the hydroxide may be measured using known methods. For example, the purity of the hydroxide may be obtained by measuring the content of the impurities contained in the hydroxide and by subtracting the content of the impurities from the entire quantity. In the case of aluminum hydroxide, as an example, the impurities are $Fe_2O_3$, $SiO_2$, T—$Na_2O$ and S—$Na_2O$. The content of $Fe_2O_3$ may be found by o-phenanthro phosphorus absorptiometry (JIS H 1901) following melting in a sodium carbonate-boric acid solution. The content of $SiO_2$ may be found by molybdenum blue absorptiometry (JIS H 1901) following melting in a sodium carbonate-boric acid solution. The content of T—$Na_2O$ may be found by frame photometry following melting in sodium carbonate-boric acid solution. The content of T—$Na_2O$ may be found by frame photometry following extraction with warm water. The content, found as described above, may then be subtracted from the weight of aluminum hydroxide to give the purity of the hydroxide. If the purity is 99.5% or higher, plural different flame retardant hydroxides may, of course, be used in combination.

Although there is no limitation to the shape of the hydroxide, used in the present embodiment, it is preferably particulate. The average particle size of the hydroxide may suitably be selected depending on the sort of the flame retardant hydroxide. The average particle size, as found by the laser diffraction method, is desirably not larger than approximately 100 μm. There is no limitation to the particle size distribution. From the perspective of injection molding performance for the molding process and dispersibility for kneading, the above range is desirable as the average particle size. A smaller value in the above range is preferred. It is of course possible to use plural sorts of the flame retardant hydroxides for raising the filling factor into the composition.

In addition, the hydroxide is preferably a particle having a BET specific surface area as found by the nitrogen gas adsorption method not larger than approximately 20 $m^2/g$. It is of course possible to use plural sorts of the compounds having different values of the BET specific surface area for raising the filling factor into the composition. From the perspective of moldability, the BET specific surface area is desirably in the above range, and a smaller value in the above range is more preferred.

The nitrogen compound, used as flame retardant additive, may, for example, be a compound containing, in its composition, at least a nitrogen oxide of the formula of NxOy, where x and y are natural numbers. For example, a non-metallic nitric acid compound and/or a non-metallic nitrous acid compound, may be used. Examples of the nitrogen compound include nitric acid esters (RONO2), such as acetyl nitrate (C2H3NO4), aniline nitrate (C6H8N2O3), ethyl nitrate (C2H5ONO2), butyl nitrate (C4H9ONO2), isoamyl nitrate (CH3)2CHCH2CH2ONO2), isobutyl nitrate (CH3) 2CHCH2ONO2) or isopropyl nitrate (CH3)2CHONO2), ammonium nitrate (NH4NO3), guanidine nitrate (CH6N4O3), cellulose nitrate acetate (nitroacetylcellulose), cellulose nitrate (nitrocellulose), urea nitrate, hydrodinium nitrate (N2H5NO3), hydroxylammonium nitrate ((NH3O) NO3), and benzene diazonium nitrate (C6H5N3O3), and nitrous esters (RONO), such as ammonium nitrite, ethyl nitrite, methyl nitrite, propyl nitrite, butyl nitrite, isobutyl nitrite and isoamyl nitrite. The aforementioned nitrogen compounds may be used either singly or in combination.

Although there is no limitation to the shape of the flame retardant additive, it is preferably particulate. The particle size may suitably be selected depending on the type of the flame retardant additive. For example, the average particle size of the hydroxide, as found by the laser diffraction method, is preferably approximately 100 μm or less. In this case, no limitations are imposed on the particle size distribution. From the perspective of injection molding performance for the molding process and dispersibility for kneading, the above range is desirable as the average particle size. A smaller value in the above range is preferred. It is of course possible to use plural sorts of the flame retardant hydroxides for raising the filling factor into the composition.

The average particle size of the nitrogen compound is desirably 100 μm or less. The average particle size exceeding 100 μm is not desirable because it is feared that the filling factor or dispersibility may be lowered. Of course, a plural number of sorts of the flame retardant additives with respective different average particle sizes may be used in combination in order to improve the filling factor for the composition.

The flame retardant additive may be surface processed with silane-based, titanate based, aluminum-based, zircon aluminum-based, fatty acid based or wax-based surfactants. Examples of the surfactants include silane coupling agents, titanate-based coupling agents or aluminate-based coupling agents, fatty acid based surfactants, such as stearic acid, oleic acid, linolic acid, linoleic acid, linoleinic acid or eleostearic acid, fatty acid salts, such as calcium or zinc salts of the above fatty acids, and nonionic surfactants, such as polyethylene glycol derivatives.

The amount of addition of the hydroxide and the nitrogen compounds is preferably 1 to 50 parts by weight of the nitrogen compound and 20 to 120 parts by weight of the hydroxide, based on 100 parts by weight of the organic high molecular weight compound of interest. If the amount of the nitrogen compound is less than 1 part by weight, the aforementioned effect cannot be displayed sufficiently. If the amount exceeds 50 parts by weight, the mechanical strength, for example, of the organic high molecular weight compound, as the target system of addition, tends to be deteriorated. The amount of addition of the nitrogen compound is more preferably 1 to 20 parts by weight. If, on the other hand, the amount of addition of the hydroxide is less than 20 parts by weight, the aforementioned effect cannot be displayed sufficiently. If the amount of addition of the hydroxide exceeds 120 parts by weight, there may be a case where undesirably the strength, for example, of the high molecular weight compound as the system for addition cannot be maintained. An optimum amount of addition of the hydroxide is 30 to 100 parts by weight.

There is also no particular limitation to the amount of the hydrolysis suppressing agent used in the present embodiment, provided that the hydrolysis suppressing agent is an additive which suppresses hydrolysis of the biodegradable high molecular weight compound. With content of the hydrolysis suppressing agent, suppressing hydrolysis of the biodegradable high molecular weight compound, the rate of hydrolysis of the biodegradable high molecular weight compound is delayed, thus providing high preservation characteristics that high mechanical strength or impact strength may be maintained for an extended period of time.

Specified hydrolysis suppressing agents may be exemplified by compounds which, similarly to those used in the aforementioned resin composition, exhibit reactivity with active hydrogen contained in the biodegradable high molecular weight compound. By adding the above compound, it becomes possible to reduce the amount of active hydrogen in the biodegradable high molecular weight compound to prevent the biodegradable high molecular chain from being catalytically hydrolyzed by the active hydrogen. The active hydrogen herein means hydrogen in the bond of oxygen or nitrogen with hydrogen (N—H or O—H bond), this hydrogen being higher in reactivity than hydrogen in the carbon-hydrogen bond (C—H bond). More specifically, such active hydrogen is present in for example the carboxylic group: —COOH, a hydroxy group —OH, an amino group: —NH2 or in an amido linkage: —NHCO— in the biodegradable high molecular weight compound.

The compound having reactivity to the active hydrogen in the biodegradable high molecular weight compound may be exemplified by a carbodiimide compound, an isocyanate compound and an oxazoline compound. In particular, the carbodiimide compound is desirable since the compound may be melted and kneaded with the biodegradable high molecular weight compound and it is sufficient to add a small amount thereof to suppress hydrolysis more effectively.

Since the specified structures of the carbodiimide compounds, isocyanate compounds and the oxazolidine compounds are similar to those discussed above, reference is to be made to the above description and detailed description is dispensed with.

There is also no particular limitation to the sorts or the amounts of the hydrolysis suppressing agent. Since the rate of biodegradation and further the mechanical strength of the molded product may be adjusted by suitably adjusting the sorts or the amounts of the hydrolysis suppressing agent, the sorts or the amounts of the hydrolysis suppressing agent may be determined depending on the targeted ultimate product. For example, the hydrolysis suppressing agent may be added in an amount not more than 20 parts by weight and preferably in an amount not more than 13 parts by weight based on 100 parts by weight of the organic high molecular weight compound.

There is no limitation to the method for preparing the resin composition of the present embodiment, such that any suitable known method may be used. Such a method consisting in melting the flame retardant additive and the hydrolysis suppressing agent and mixing the resulting product to the biodegradable organic high molecular weight compound may be recited as a preferred method for preparing the resin composition.

The method by melting and kneading is carried out by adding the flame retardant additive and the hydrolysis suppressing agent before or when melting the biodegradable organic high molecular weight compound and mixing the resulting mass. The flame retardant additive and the hydrolysis suppressing agent may be added simultaneously or separately. If the flame retarder and the hydrolysis suppressing agent are added separately, any one of them may be added first. In an alternative method, the biodegradable organic high molecular weight compound is melted and thereafter the flame retarder or the hydrolysis suppressing agent is added and mixed. The resulting composition is re-melted together and the remaining one of the hydrolysis suppressing agent and the flame retarder is added and mixed. The hydroxide, phosphor-containing compound and the nitrogen compound, as the flame retardant additive, may be added simultaneously or separately. The flame retardant additive used may also be compounded of constituent components.

Other suitable additives may be used in the resin composition of the present embodiment, for improving its performance, as long as such addition is not contrary to the object of the present invention. These other additives include, in addition to reinforcements, anti-oxidants, thermal stabilizers and UV ray absorbers, lubricants, waxes, coloring matter, crystallization accelerators, anti-dripping agents and degradable organic substances, such as starch, only by way of examples. These additives may be used either alone or in combination.

Although no particular limitations are imposed on the plasticizers, used as an additive of the resin composition of the present embodiment, there are phosphates and carboxylates, only by way of examples.

Specified examples of the phosphates are triphenyl phosphate (TPP), tricresyl phosphate (TCP), cresyl diphenyl phosphate, octyl diphenyl phosphate, diphenyl biphenyl phosphate, trioctyl phosphate and tributyl phosphate.

Specified examples of the carboxylates include phthalates and citrates. Examples of the citrates are dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrates are o-acetyl triethyl citrate (OACTE), o-acetyl tributyl citrate (OACTB), acetyl triethyl citrate and acetyl tributyl phthalate.

Other examples of carboxylates include butyl oleinate, methylacetyl licinolate, dibutyl sebacinate, and a variety of trimellitates.

Glycolates may also be used. Examples of the glycolates include triacetin, tributyrin, butyl phthalyl butyl glycolate and ethyl phthalyl butyl glycolate. In particular, triphenyl phosphate, tricresyl phosphate, cresyl diphenyl phosphate, tributyl phosphate, dimethyl phthalate, diethyl phthalate, dibutyl phthalate, dioctyl phthalatem diethyl hexyl phthalate, triacetin and ethyl phthalyl ethyl glycolate are preferred. These plasticizers may be used either singly or in combination.

The reinforcements added to the resin composition of the present embodiment may be enumerated by fillers, such as inorganic fillers or organic fillers. As these fillers, the fillers added to the resin compositions of the above-described Examples may be used unchanged. Hence, reference is made to the above description and detailed description is dispensed with.

As for the anti-oxidants, phenol-, amine-, phosphorus-, sulfur-, hydroquinone- or quinoline-based anti-oxidants may be used, as in the previous embodiment. Since the specified examples of these anti-oxidants are as discussed above, reference is made to the previous description and detailed explanation is dispensed with.

As for thermal stabilizers and UV ray absorbers, as additives, used in the resin composition of the present embodiment, those given above may directly be used. Hence, reference is made to the previous description and detailed explanation is dispensed with.

As for the lubricants, waxes, coloring matter, crystallization accelerators, anti-dripping agents and degradable organic substances, such as starch, those added to the above-described various resin compositions may be used unchanged. Consequently, reference may be had to the previous description and detailed description is dispensed with.

As for the resin composition of the present embodiment, similarly to the aforementioned resin compositions, an active energy beam may be illuminated for suppressing hydrolysis of the biodegradable high molecular weight compound.

The active energy dose, used here, may be exemplified by an electromagnetic wave, electron beams, corpuscular radiation and combinations thereof. The electromagnetic wave may be exemplified by ultraviolet rays (UV rays) and X-rays, while the corpuscular radiation may be exemplified by radiations of corpuscles, such as protons or neutrons. In particular, radiation of electron beams, with the aid of an electron accelerator, is preferred.

The active energy radiation may be illuminated using known devices. These devices may be enumerated by UV illuminating devices and electron accelerators. There is no particular limitation to the dose of illumination and illumination intensity as long as the hydrolysis of the biodegradable high molecular weight compound is effectively delayed within the range of the dose of illumination and illumination intensity value used. For example, in the case of the electron beam, it is preferred that the acceleration voltage is of the order of approximately 100 to 5000 kV and the dose of the illumination is not less than approximately 1 kGy.

The molded products, obtained on molding the resin composition of the present embodiment, may be put to a variety of uses. The molding method, used for preparing molded products, may be enumerated by pressure forming, film forming, extrusion or injection molding. Of these, the injection molding is most desirable. Specifically, the injection molding is carried out as conventionally, using a uniaxial extruder, a multi-axial extruder or a tandem extruder. The injection molding may also be carried out, as conventionally, using known injection molding machines, such as an in-line screw injection extruder, a multi-layer injection molding machine or a double-head injection molding machine. There is no particular limitation to the methods for preparing molded products by molding the resin composition and any of known molding methods may be used.

With the resin composition, containing the biodegradable organic high molecular weight compound, the phosphorus-containing compounds, displaying high flame-retardant properties, when combined with the biodegradable organic high molecular weight compound, and the hydrolysis suppressing agent, it is possible to achieve compatibility between extremely high flame retardant properties, satisfying the range of from V0 to V1, when evaluation is made by e.g. a UV combustibility test, and excellent preservation characteristics, which will sufficiently assure the use of the resin composition as a feedstock for a casing for an electrical product.

The molded product, formed of the resin composition of the present embodiment, is essentially composed of a biodegradable resin, which is a safe component for the living organism. This biodegradable resin may readily be decomposed in nature so that any adverse effects on the environment at the time of or after disposal may be diminished. Moreover, the flame-retardant additives, used in the present embodiment, exhibit high flame retardant properties and, after disposal, are decomposed into components which are not detrimental to the living organisms or the global environment, such asalumina, water or carbon dioxide. Hence, the flame-retardant additives have no adverse influences on the environment or on the human being. When the molded products are used for casings or packaging materials of the electrical products, sufficient consideration has been taken for environment as compared to the case of employing pre-existing synthetic resins or biodegradable resins.

Similarly to the aforementioned product, employing the resin composition, the molded product, obtained on molding the resin composition of the present embodiment, may be applied with advantage to a part of an electrical product for which it has been thought to be difficult to use the biodegradable resin. Concrete examples of the electrical products are the same as those described above and hence the detailed description is dispensed with.

Next, an Example of the resin composition of the present embodiment will be described.

<Experiment 5>
(Preparation of Samples)

As biodegradable aliphatic polyester, (A1) RATIA belonging to polylactic acid (H100J manufactured by MITSUI KAGAKU-SHA), (A2) BIONORE belonging to polybutylene succinate (#1020 manufactured by SHOWA KOBUNSHI SHA), (B) hydrolysis suppressing agent (CARBODILITE HMV-8CA, manufactured by NISSHIN BOSEKI-SHA), (C) various flame retardant additives (C1: aluminum hydroxide, manufactured by WAKO JUNYAKU-SHA), C2: ammonium nitrate, manufactured by DAIHACHI KAGAKU KOGYO SHA), were used. A melt kneading method was used for mixing A, B and C.

As for kneading conditions, a MINIMAX-MIXRUDER, manufactured by TOYO SEIKI SHA, was used as a kneader. With the nozzle temperature set to 170 to 175° C., the torque set to 4 to 6 kg and with the time of residence set to three seconds or less, an additive was added to the resin by kneading. The resin composite material, thus produced, was pulverized, and subjected to press working at 170° C. under a pressure of 300 kg/cm2, to form a plate 1.0 mm in thickness. The plate was cut to measurement test pieces each of a size of 12.7 mm×12.7 mm. The composition of the test pieces of Examples 84 to 94 and Comparative Examples 21 to 24 are shown in Table 6.

A combustion test and a preservation test were then carried out in the following manner on the test pieces of the Examples 85 to 94 and the Comparative Examples 21 to 24, prepared as described above. Then, evaluation on the flame retardant properties and preservation characteristics was then made of the test pieces.

(Combustion Test)

A perpendicular combustion test was carried out on the above test pieces in accordance with UL94 combustibility test. This method will now be explained.

Each sample was kept with its longitudinal axis on a plumb line, and a site 6.4 mm from its upper end of each sample was held by a clamp of a ring stand. The foremost part of a burner was set 9.5 mm below the lower end of the sample and a horizontal layer of dried absorbent cotton for surgical use was spread 305 mm below the lower end of the sample. For providing the horizontal layer, a small piece, about 12.7 mm by 25.4 mm, of the cotton was torn off from the lump of the absorbent cotton, with the tip of a thumb finger and an index finger of an operator, and spread apart with the operator's fingers, so that the piece of cotton is 50.8 mm square and has a spontaneous thickness of 6.4 mm.

The burner was placed at a position spaced apart from the sample and ignited. The burner, so ignited, was adjusted so that it will issue a blue flame 19 mm in height. Specifically, the amount of the gas supplied and an air port of the burner were adjusted so that initially a yellow blue flame will be issued at 19 mm from the burner end, The air volume was then adjusted so that the foremost yellow flame disappeared. The height of the flame was again measured to make adjustment as necessary.

A test flame was applied to the center of the lower end of the test sample and kept there for ten seconds. The flame was then moved away from the sample at least 152 mm and the time during which the sample burned as it emitted a flame was recorded. When the flame of the sample was extinguished, the test flame was immediately applied again to the lower end of the sample. In ten seconds, the flame was again moved away from the sample and the time durations of combustion with and without the flame were recorded. If it is difficult to distinguish between the presence of flame and absence of flame, the cotton for surgical use is contacted with the site at issue. If the cotton is ignited, the flame is present. If, when the flame is contacted with the site at issue, melted or ignited sample portions are dripped from the sample, it is possible to tilt the burner at an angle of 45° during the time the flame is contacted with the sample, and furthermore to move the burner slightly away from the side of 12.7 mm of the sample to avoid the material from dripping into a burner tube. In case the fused or ignited sample portion is dripped from the sample or continues to be burned during the test, it is necessary to hold the burner manually to maintain the interval of 9.5 mm between the lower end of the sample and the distal end of the burner tube as long as the flame is contacted with the sample. The dripping of the fused cotton must be negligible, and the flame must be contacted with the sample center.

The material for 94V-1 approval, that is, the material approved to satisfy 94V-1, must conform to the following conditions:

(a) None of the samples should burn with the flame for 30 seconds or longer after each flame application;

(b) A total of ten flame contacting operations must be carried out for five samples of each set. The total of the burning time with flame must not exceed 250 seconds.

(c) None of the samples should reach the supporting clamp.

(d) The absorbent cotton for surgical use, disposed 305 mm below, should not be ignited by cotton portions dripping from the cotton sample.

(e) None of the samples should continue to be burned in a flameless state for 60 seconds or longer after moving the flame apart a second time.

(Preservation Test)

The molded product, prepared using the resin composition of the present embodiment, is required to possess preservation characteristics to a certain extent, for use as a molded article in e.g. a casing of an electrical apparatus, even though the molded product is biodegradable. In this consideration, the preservation characteristics at elevated temperature and humidity were evaluated. For this evaluation, each sample was preserved for 100 hours, at a temperature of 80° C. and at a relative humidity of 80%, and the shape as well as the molecular weight of the sample after lapse of this time duration was measured. The same test pieces as those used in the above combustion test were used. The test pieces which were not problematical in shape and had a molecular weight upholding ratio from the pre-evaluation value of 80% or higher were evaluated o and those which failed to meet this requirement were evaluated x. The molecular weight was evaluated by the CPC (Gel Permeation Chromatography). The following Table 6 shows the results of the combustion and preservation tests of the Examples 85 to 94 and the Comparative Examples 21 to 24. Meanwhile, in the following table, [UL94-V1; o] denotes that the sample in question is the 94V-1 approved material, while [UL94-V1; x] denotes that the sample in question is not the 94V-1 approved material.

TABLE 6

| | Polylactic acid (A1) (parts by weight) | Polybutylene succinate (A2) (parts by weight) | Hydrolysis suppressing agent (B) (parts by weight) |
|---|---|---|---|
| Ex. 85 | 100 | 40 | 10 |
| Ex. 86 | 100 | 40 | 10 |
| Ex. 87 | 100 | 40 | 10 |
| Ex. 88 | 100 | 40 | 10 |
| Ex. 89 | 100 | 40 | 10 |
| Ex. 90 | 100 | 40 | 10 |
| Ex. 91 | 100 | 40 | 10 |
| Ex. 92 | 100 | 40 | 10 |
| Ex. 93 | 100 | 40 | 10 |
| Ex. 94 | 100 | 40 | 10 |
| Comp. Ex. 21 | 100 | 40 | 10 |
| Comp. Ex. 22 | 100 | 40 | 10 |
| Comp. Ex. 23 | 100 | 40 | 10 |
| Comp. Ex. 24 | 100 | 40 | — |

| | Aluminum Hydroxide (C1) (parts by weight) | Ammonium Nitrate (C2) (parts by weight) | UL94V-1 | Preservation characteristics |
|---|---|---|---|---|
| Ex. 85 | 20 | 50 | o | o |
| Ex. 86 | 30 | 40 | o | o |
| Ex. 87 | 40 | 35 | o | o |
| Ex. 88 | 50 | 30 | o | o |
| Ex. 89 | 60 | 25 | o | o |
| Ex. 90 | 70 | 20 | o | o |
| Ex. 91 | 80 | 15 | o | o |
| Ex. 92 | 90 | 10 | o | o |
| Ex. 93 | 110 | 1 | o | o |
| Ex. 94 | 120 | 1 | o | o |
| Comp. Ex. 21 | — | — | x | o |
| Comp. Ex. 22 | 50 | — | x | o |
| Comp. Ex. 23 | — | 10 | x | o |
| Comp. Ex. 24 | 50 | 10 | o | X |

It is seen from Table 6 that the Examples 85 to 94, containing biodegradable aliphatic polyester (A1 and A2), hydrolysis suppressing agent (B) and the flame retardant additive (C) exhibit high flame retardant properties to the extent that the UL94V-1 prescriptions is met, and high preservation characteristics. Conversely, the Comparative Example 21, not containing the flame retardant additive, the Comparative Example 22 lacking in the nitrogen compound of the flame retardant additive, and the Comparative Example 23, lacking in the hydroxide, failed to comply with the UL94V-1 prescriptions. The Comparative Example 24, not containing the hydrolysis suppressing agent, was deteriorated in preservation characteristics, when compared with the Examples. It is seen from the above results that, by admixing the nitrogen compound, hydroxide and the hydrolysis suppressing agent, it becomes possible to achieve compatibility between the flame retardant properties and the preservation characteristics.

Although the present invention has so far been explained with reference to the preferred embodiments, the present invention is not limited to the particular configurations of these embodiments. It will be appreciated that the present invention may encompass various changes or corrections such as may readily be arrived at by those skilled in the art within the scope and the principle of the invention.

The invention claimed is:

1. A resin composition comprising:
   at least one biodegradable organic high molecular weight compound;
   a flame retardant additive containing (1) a phosphorus-containing compound, (2) a hydroxide, and (3) a nitrogen oxide having the formula $N_xO_y$ and selected from the group consisting of a non-metallic nitric acid compound and/or a non-metallic nitrous acid compound; and
   a hydrolysis suppressing agent suppressing hydrolysis of said at least one biodegradable organic high molecular weight compound,
   wherein,
      an amount of hydroxide is from 30 to 100 parts by weight to 100 parts by weight of the organic high molecular weight compound,
      an amount of phosphorous in the phosphorus-containing compound is not more than 20 parts by weight to 100 parts by weight of the composition of the entire resin composition,
      at least one biodegradable organic high molecular weight compound is cellulose or a derivate thereof.

2. The resin composition according to claim 1 wherein said resin composition includes an organic high molecular weight compound that is an aliphatic polyester resin, a polysaccharide, a peptide, polyvinyl alcohol, a polyamide, a polyalkylene glycol or a copolymer containing at least one thereof.

3. The resin composition according to claim 2 wherein said aliphatic polyester resin is polylactic acid, polycaprolactone, polyhydroxy lactic acid, polyhydroxy valeric acid, polyethylene succinate, polybutylene succinate, polybutylene adipate, polymalic acid, polyester synthesized by fermentation or a copolymer containing at least one thereof.

4. The resin composition according to claim 2 wherein said polysaccharide is starch, chitin, chitosan, dextran, one of the derivatives of starch, or a copolymer containing at least one thereof.

5. The resin composition according to claim 1 wherein said hydroxide includes at least one metal hydroxide.

6. The resin composition according to claim 5 wherein said metal hydroxide is selected from the group consisting of at least one of aluminum hydroxide, magnesium hydroxide and calcium hydroxide.

7. The resin composition according to claim 1 wherein the average particle size of said hydroxide is 100 μm or less.

8. The resin composition according to claim 1 wherein the average particle size of said nitrogen compound is 100 μm or less.

9. The resin composition according to claim 1 wherein the phosphorus-containing compound is selected from the group consisting of at least one of the organic phosphorus compound and phosphorus.

10. The resin composition according to claim 1 wherein the hydrolysis suppressing agent is a carbodiimide compound, an isocyanate compound or an oxazoline compound.

11. A molded product obtained on molding a resin composition comprising:
   at least one biodegradable organic high molecular weight compound;
   a flame retardant additive containing a (1) phosphorus-containing compound, (2) a hydroxide and (3) a nitrogen oxide having the formula $N_xO_y$ and selected from the group consisting of a non-metallic nitric acid compound and/or a non-metallic nitrous acid compound; and
   a hydrolysis suppressing agent suppressing hydrolysis of said at least one biodegradable organic high molecular weight compound,
   wherein,
      an amount of hydroxide is from 30 to 100 parts by weight to 100 parts by weight of the organic high molecular weight compound,
      an amount of phosphorous in the phosphorus-containing compound is not more than 20 parts by weight to 100 parts by weight of the composition of the entire resin composition, and
      at least one biodegradable organic high molecular weight compound is cellulose or a derivate thereof.

12. An electrical product including, as a component element thereof, a molded product obtained on molding a resin composition comprising:
   at least one biodegradable organic high molecular weight compound;
   a flame retardant additive containing (1) a phosphorus-containing compound, (2) a hydroxide and (3) a nitrogen oxide having the formula $N_xO_y$ and selected from the group consisting of a non-metallic nitric acid compound and/or a non-metallic nitrous acid compound; and
   a hydrolysis suppressing agent suppressing hydrolysis of said at least one biodegradable organic high molecular weight compound,
   wherein,
      an amount of hydroxide is from 30 to 100 parts by weight to 100 parts by weight of the organic high molecular weight compound,
      an amount of phosphorous in the phosphorus-containing compound is not more than 20 parts by weight to 100 parts by weight of the composition of the entire resin composition, and
      at least one biodegradable organic high molecular weight compound is cellulose or a derivate thereof.

13. The electrical product according to claim 12 wherein said component element is a casing.

14. A method for fabrication of a resin composition comprising the step of:
   combining (a) at least one biodegradable organic high molecular weight compound, (b) a flame retardant additive containing (1) a phosphorus-containing compound, (2) a hydroxide, and (3) a nitrogen oxide having the formula $N_xO_y$ and selected from the group consisting of a non-metallic nitric acid compound and/or a non-metallic nitrous acid compound and (c) a hydrolysis suppressing agent suppressing hydrolysis of said at least one biodegradable organic high molecular weight compound,
   wherein,
      an amount of hydroxide is from 30 to 100 parts by weight to 100 parts by weight of the organic high molecular weight compound,
      an amount of phosphorous in the phosphorus-containing compound is not more than 20 parts by weight to 100 parts by weight of the composition of the entire resin composition, and
      at least one biodegradable organic high molecular weight compound is cellulose or a derivate thereof.

15. A resin composition comprising:
   at least one biodegradable organic high molecular weight compound;
   a flame retardant additive containing (1) a phosphorus-containing compound, (2) a hydroxide, and (3) a nitrogen oxide having the formula $N_xO_y$ and selected from the group consisting of a non-metallic nitric acid compound and/or a non-metallic nitrous acid compound; and
   a hydrolysis suppressing agent suppressing hydrolysis of said at least one biodegradable organic high molecular weight compound,
   wherein,
      an amount of hydroxide is from 30 to 100 parts by weight to 100 parts by weight of the organic high molecular weight compound,
      an amount of phosphorous in the phosphorus-containing compound is not more than 20 parts by weight to 100 parts by weight of the composition of the entire resin composition, and
      at least one biodegradable organic high molecular weight compound is cellulose or a derivate thereof.

16. The resin composition according to claim 15 wherein said resin composition includes an organic high molecular weight compound is an aliphatic polyester resin, a polysaccharide, a peptide, polyvinyl alcohol, a polyamide, a polyalkylene glycol or a copolymer containing at least one thereof.

17. The resin composition according to claim 16 wherein said aliphatic polyester resin is polylactic acid, polycaprolactone, polyhydroxy lactic acid, polyhydric valeric acid, polyethylene succinate, polybutylene succinate, polybutylene adipate, polymalic acid, polyester synthesized by fermentation or a copolymer containing at least one thereof.

18. The resin composition according to claim 15 wherein the average particle size of said hydroxide is 100 μm or less.

19. The resin composition according to claim 15 wherein said hydroxide includes at least one metal hydroxide.

20. The resin composition according to claim 19 wherein said metal hydroxide is selected from the group consisting of at least one of aluminum hydroxide, magnesium hydroxide and calcium hydroxide.

21. The resin composition according to claim 15 wherein the average particle size of said nitrogen compound is 100 μm or less.

22. The resin composition according to claim 15 wherein the hydrolysis suppressing agent is a carbodiimide compound, an isocyanate compound or an oxazoline compound.

23. A molded product obtained on molding a resin composition comprising:
  at least one biodegradable organic high molecular weight compound;
  a flame retardant additive containing (1) a phosphorus-containing compound, (2) a hydroxide and (3) a nitrogen oxide having the formula $N_xO_y$ and selected from the group consisting of a non-metallic nitric acid compound and/or a non-metallic nitrous acid compound; and
  a hydrolysis suppressing agent suppressing hydrolysis of said at least one biodegradable organic high molecular weight compound,
  wherein,
    an amount of hydroxide is from 30 to 100 parts by weight to 100 parts by weight of the organic high molecular weight compound,
    an amount of phosphorous in the phosphorus-containing compound is not more than 20 parts by weight to 100 parts by weight of the composition of the entire resin composition, and
    at least one biodegradable organic high molecular weight compound is cellulose or a derivate thereof.

24. An electrical product including, as a component element thereof, a molded product obtained on molding a resin composition comprising:
  at least one biodegradable organic high molecular weight compound;
  a flame retardant additive containing (1) a phosphorus-containing compound (2) a hydroxide and (3) a nitrogen oxide having the formula $N_xO_y$ and selected from the group consisting of a non-metallic nitric acid compound and/or a non-metallic nitrous acid compound; and
  a hydrolysis suppressing agent suppressing hydrolysis of said at least one biodegradable organic high molecular weight compound,
  wherein,
    an amount of hydroxide is from 30 to 100 parts by weight to 100 parts by weight of the organic high molecular weight compound,
    an amount of phosphorous in the phosphorus-containing compound is not more than 20 parts by weight to 100 parts by weight of the composition of the entire resin composition, and
    at least one biodegradable organic high molecular weight compound is cellulose or a derivate thereof.

25. The electrical product according to claim 24 wherein said component element is a casing.

26. A method for fabrication of a resin composition comprising the step of:
  compounding at least one biodegradable organic high molecular weight compound, a flame retardant additive containing (1) a phosphorus-containing compound, (2) a hydroxide and (3) a nitrogen oxide having the formula $N_xO_y$ and selected from the group consisting of a non-metallic nitric acid compound and/or a non-metallic nitrous acid compound, and a hydrolysis suppressing agent suppressing hydrolysis of said at least one biodegradable organic high molecular weight compound,
  wherein,
    an amount of hydroxide is from 30 to 100 parts by weight to 100 parts by weight of the organic high molecular weight compound,
    an amount of phosphorous in the phosphorus-containing compound is not more than 20 parts by weight to 100 parts by weight of the composition of the entire resin composition, and
    at least one biodegradable organic high molecular weight compound is cellulose or a derivate thereof.

27. The resin composition according to claim 15, wherein the hydroxide compound is 100 parts by weight of the biodegradable organic high molecular compound.

* * * * *